(12) United States Patent
Kawasaki et al.

(10) Patent No.: US 10,954,578 B2
(45) Date of Patent: Mar. 23, 2021

(54) HIGH-STRENGTH STEEL SHEET AND METHOD FOR MANUFACTURING SAME

(71) Applicant: JFE STEEL CORPORATION, Tokyo (JP)

(72) Inventors: Yoshiyasu Kawasaki, Tokyo (JP); Hiroshi Matsuda, Tokyo (JP); Takeshi Yokota, Tokyo (JP); Takako Yamashita, Tokyo (JP); Kazuhiro Seto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 491 days.

(21) Appl. No.: 15/520,236

(22) PCT Filed: Oct. 29, 2015

(86) PCT No.: PCT/JP2015/005459
§ 371 (c)(1),
(2) Date: Apr. 19, 2017

(87) PCT Pub. No.: WO2016/067625
PCT Pub. Date: May 6, 2016

(65) Prior Publication Data
US 2017/0314091 A1 Nov. 2, 2017
US 2018/0127847 A9 May 10, 2018

(30) Foreign Application Priority Data

Oct. 30, 2014 (JP) .............................. JP2014-221903

(51) Int. Cl.
*C21D 9/46* (2006.01)
*C23C 2/12* (2006.01)
(Continued)

(52) U.S. Cl.
CPC .............. *C21D 9/46* (2013.01); *B32B 15/012* (2013.01); *C21D 6/001* (2013.01); *C21D 6/002* (2013.01);
(Continued)

(58) Field of Classification Search
CPC .................................................... C21D 8/0226
See application file for complete search history.

(56) References Cited

U.S. PATENT DOCUMENTS 9,580,779 B2   2/2017   Kawasaki et al.
10,550,446 B2  2/2020   Kawasaki et al.
(Continued)

FOREIGN PATENT DOCUMENTS

EP     2757169 A1    7/2014
JP     S61157625 A   7/1986
(Continued)

OTHER PUBLICATIONS

English Machine translation of JP_2008291282_A (Year: 2008).*
(Continued)

*Primary Examiner* — Alexandra M Moore
*Assistant Examiner* — Catherine P Smith
(74) *Attorney, Agent, or Firm* — Kenja IP Law PC

(57) ABSTRACT

Disclosed is a steel sheet having a predetermined chemical composition and a steel microstructure that contains, in area ratio, 35% or more and 80% or less of polygonal ferrite and 5% or more and 25% or less of martensite, and that contains, in volume fraction, 8% or more of retained austenite, in which the polygonal ferrite, the martensite, and the retained austenite have a mean grain size of 6 μm or less, 3 μm or less, and 3 μm or less, respectively, and each have a mean grain aspect ratio of 2.0 or less, and in which a value
(Continued)

obtained by dividing an Mn content in the retained austenite in mass % by an Mn content in the polygonal ferrite in mass % equals 2.0 or more.

13 Claims, 1 Drawing Sheet

(51) Int. Cl.

| | |
|---|---|
| C23C 2/28 | (2006.01) |
| C22C 38/60 | (2006.01) |
| C23C 2/02 | (2006.01) |
| C23C 2/06 | (2006.01) |
| C22C 38/14 | (2006.01) |
| C22C 38/00 | (2006.01) |
| B32B 15/01 | (2006.01) |
| C21D 6/00 | (2006.01) |
| C21D 8/02 | (2006.01) |
| C22C 38/02 | (2006.01) |
| C22C 38/08 | (2006.01) |
| C22C 38/12 | (2006.01) |
| C22C 38/16 | (2006.01) |
| C22C 38/28 | (2006.01) |
| C22C 38/38 | (2006.01) |
| C23C 2/40 | (2006.01) |
| C23G 1/00 | (2006.01) |
| C25D 3/22 | (2006.01) |

(52) U.S. Cl.
CPC ............ *C21D 6/005* (2013.01); *C21D 6/008* (2013.01); *C21D 8/0205* (2013.01); *C21D 8/0226* (2013.01); *C21D 8/0263* (2013.01); *C21D 8/0278* (2013.01); *C22C 38/00* (2013.01); *C22C 38/001* (2013.01); *C22C 38/002* (2013.01); *C22C 38/008* (2013.01); *C22C 38/02* (2013.01); *C22C 38/08* (2013.01); *C22C 38/12* (2013.01); *C22C 38/14* (2013.01); *C22C 38/16* (2013.01); *C22C 38/28* (2013.01); *C22C 38/38* (2013.01); *C22C 38/60* (2013.01); *C23C 2/02* (2013.01); *C23C 2/06* (2013.01); *C23C 2/12* (2013.01); *C23C 2/28* (2013.01); *C23C 2/40* (2013.01); *C23G 1/00* (2013.01); *C25D 3/22* (2013.01); *B32B 2255/06* (2013.01); *B32B 2255/205* (2013.01)

(56) References Cited

U.S. PATENT DOCUMENTS

| | | | | |
|---|---|---|---|---|
| 2005/0081966 | A1* | 4/2005 | Kashima | C22C 38/04 |
| | | | | 148/651 |
| 2008/0131305 | A1* | 6/2008 | Okitsu | C22C 38/04 |
| | | | | 420/106 |
| 2008/0302452 | A1* | 12/2008 | Siekmeyer | C22C 38/02 |
| | | | | 148/519 |
| 2010/0084057 | A1 | 4/2010 | Furuhashi et al. | |
| 2010/0132849 | A1* | 6/2010 | Takagi | C21D 6/005 |
| | | | | 148/533 |
| 2011/0036465 | A1 | 2/2011 | Kawasaki et al. | |
| 2011/0139315 | A1* | 6/2011 | Nakagaito | C22C 38/005 |
| | | | | 148/533 |
| 2013/0032253 | A1* | 2/2013 | Kariya | C21D 8/0226 |
| | | | | 148/533 |
| 2014/0056753 | A1* | 2/2014 | Naitou | B21D 22/022 |
| | | | | 420/90 |
| 2014/0170439 | A1 | 6/2014 | Allain et al. | |
| 2014/0230971 | A1* | 8/2014 | Kawasaki | C23C 2/02 |
| | | | | 148/533 |
| 2014/0238557 | A1 | 8/2014 | Haga et al. | |
| 2014/0242416 | A1* | 8/2014 | Matsuda | C22C 38/08 |
| | | | | 428/659 |
| 2015/0000796 | A1 | 1/2015 | Kakiuchi et al. | |
| 2015/0034219 | A1 | 2/2015 | Kawabe et al. | |
| 2016/0222485 | A1* | 8/2016 | Murakami | C22C 38/00 |
| 2016/0237515 | A1* | 8/2016 | Kajihara | C21D 9/46 |
| 2017/0314091 | A1 | 11/2017 | Kawasaki et al. | |
| 2019/0276907 | A1 | 9/2019 | Yamashita et al. | |

FOREIGN PATENT DOCUMENTS

| | | | | |
|---|---|---|---|---|
| JP | H01259120 | A | | 10/1989 |
| JP | 2003138345 | A | | 5/2003 |
| JP | 2003277884 | A | | 10/2003 |
| JP | 2004360064 | A | * | 12/2004 |
| JP | 2005307246 | A | * | 11/2005 |
| JP | 2008291282 | A | * | 12/2008 |
| JP | 4374196 | B2 | * | 12/2009 |
| JP | 2013014824 | A | | 1/2013 |
| JP | 2013076162 | A | | 4/2013 |
| JP | 2013185196 | A | | 9/2013 |
| JP | 2014514459 | A | | 6/2014 |
| WO | WO-2013038637 | A1 | * | 3/2013 ............ C22C 2/02 |

OTHER PUBLICATIONS

JP-4374196-B2 English Machine Translation (Year: 2009).*
English Machine translation of JP-2005307246-A (Year: 2005).*
English Machine translation of JP-2004360064-A (Year: 2004).*
Jul. 17, 2018, Office Action issued by the Korean Intellectual Property Office in the corresponding Korean Patent Application No. 10-2017-7014210 with English language.
Jan. 26, 2016, International Search Report issued in the International Patent Application No. PCT/JP2015/005459.
Mar. 25, 2020, Office Action issued by the United States Patent and Trademark Office in the U.S. Appl. No. 15/735,678.
Dec. 9, 2019, Office Action issued by the United States Patent and Trademark Office in U.S. Appl. No. 15/742,116.
Jun. 26, 2020, Office Action issued by the United States Patent and Trademark Office in the U.S. Appl. No. 15/735,678.
Sep. 29, 2020, Office Action issued by the United States Patent and Trademark Office in the U.S. Appl. No. 15/742,116.

\* cited by examiner

HIGH-STRENGTH STEEL SHEET AND METHOD FOR MANUFACTURING SAME

TECHNICAL FIELD

This disclosure relates to a steel sheet with excellent formability and low yield ratio that is preferably used in parts in the industrial fields of automobiles, electronics, and the like, and a method for manufacturing the same.

BACKGROUND

In recent years, enhancement of fuel efficiency of automobiles has become an important issue from the viewpoint of global environment protection. Consequently, there is an active movement to reduce the thickness of vehicle body components through increases in strength of vehicle body materials, and thereby reduce the weight of vehicle body itself.

In general, however, strengthening of steel sheets leads to deterioration in formability, causing the problem of cracking during forming. It is thus not simple to reduce the thickness of steel sheets. Therefore, it is desirable to develop materials with increased strength and good formability. In addition, in an automobile manufacturing process, steel sheets with a tensile strength (TS) of 590 MPa or more are subjected to press working, assembled using arc welding, spot welding, and the like, and combined into modules. Such steel sheets are thus required to have high dimensional accuracy on assembly.

Accordingly, such steel sheets should have good formability and be resistant to defects that could occur after working, such as springback. To this end, it is important for the steel sheets to have low yield ratio (YR) before subjection to working.

For example, JPS61157625A (PTL 1) proposes a steel sheet with extremely high ductility having a tensile strength of 1000 MPa or higher and a total elongation (EL) of 30% or more, utilizing deformation induced transformation of retained austenite.

In addition, JPH1259120A (PTL 2) proposes a steel sheet that is obtained from high-Mn steel, aiming to achieve well-balanced strength and ductility through heat treatment in a ferrite-austenite dual phase region.

Moreover, JP2003138345A (PTL 3) proposes a steel sheet that is obtained from high-Mn steel, aiming to achieve improved local ductility by being subjected to hot rolling to have a microstructure containing bainite and martensite, followed by annealing and tempering to cause fine retained austenite, and subsequently tempered bainite or tempered martensite in the microstructure.

CITATION LIST

Patent Literature

PTL 1: JPS61157625A
PTL 2: JPH1259120A
PTL 3: JP2003138345A

SUMMARY

Technical Problem

The steel sheet described in PTL 1 is manufactured by austenitizing a steel sheet containing C, Si, and Mn as basic components, and subjecting the steel sheet to a so-called austempering process whereby the steel sheet is quenched to and held isothermally in a bainite transformation temperature range. During the austempering process, C concentrates in austenite to form retained austenite.

However, a high concentration of C beyond 0.3 mass % is required for the formation of a large amount of retained austenite, such a high C concentration above 0.3 mass % leads to a significant decrease in spot weldability, which may not be suitable for practical use in steel sheets for automobiles.

Additionally, the main objective of PTL 1 is improving the ductility of steel sheets, without any consideration for the hole expansion formability, bendability, or yield ratio.

PTLs 2 and 3 describes techniques for improving the ductility of steel sheets from the perspective of formability, but do not consider the bendability or yield ratio of steel sheets.

It could thus be helpful to provide a high strength steel sheet with excellent formability and low yield ratio, specifically, a high strength steel sheet having YR (yield ratio) of less than 68% and TS (tensile strength) of 590 MPa or more, and a method for manufacturing the same.

As used herein, the term "high-strength steel sheet" includes a high-strength steel sheet having a hot-dip galvanized layer on its surface (a high-strength hot-dip galvanized steel sheet), a high-strength steel sheet having a hot-dip aluminum-coated layer on its surface (a high-strength hot-dip aluminum-coated steel sheet), and a high-strength steel sheet having an electrogalvanized layer on its surface (a high-strength electrogalvanized steel sheet).

Solution to Problem

We made intensive studies regarding high-strength steel sheets with excellent formability and low yield ratio, and discovered the following.

(1) To obtain a high-strength steel sheet that that exhibits excellent formability such as ductility, bendability, and hole expansion formability, and that has YR of less than 68% and TS of 590 MPa or more, the following factors are important:

The Mn content should be 2.60 mass % or more and 4.20 mass % or less, and the other components be adjusted within predetermined ranges.

The steel microstructure should contain polygonal ferrite, martensite, and retained austenite in appropriate amounts, and these constituent phases should be refined. In addition, the mean aspect ratio of grains of these constituent phases and the value obtained by dividing the Mn content in retained austenite (in mass %) with the Mn content in polygonal ferrite (in mass %) should be adjusted within appropriate ranges.

(2) Further, to prepare the microstructure as described above, it is important to adjust the contents of the chemical composition components within predetermined ranges, and to control the manufacturing conditions appropriately, among others, the conditions of post-hot-rolling heat treatment (hot band annealing) and of post-cold-rolling heat treatment (cold-rolled sheet annealing).

The disclosure is based on the aforementioned discoveries and further studies.

Specifically, the primary features of this disclosure are as described below.

[1] A high-strength steel sheet comprising: a chemical composition containing (consisting of), in mass %, C: 0.030% or more and 0.250% or less, Si: 0.01% or more and 3.00% or less, Mn: 2.60% or more and 4.20% or less, P: 0.001% or more and 0.100% or less, S: 0.0001% or more and 0.0200% or less, N: 0.0005% or more and 0.0100% or less, and Ti: 0.003% or more and 0.200% or less, and the balance consisting of Fe and incidental impurities; and a steel microstructure that contains, in area ratio, 35% or more and 80% or less of polygonal ferrite and 5% or more and 25% or less of martensite, and that contains, in volume fraction, 8% or more of retained austenite, wherein the polygonal ferrite has a mean grain size of 6 µm or less, the martensite has a mean grain size of 3 µm or less, the retained austenite has a mean grain size of 3 µm or less, and the polygonal ferrite, the martensite, and the retained austenite each have a mean grain aspect ratio of 2.0 or less, and wherein a value obtained by dividing an Mn content in the retained austenite in mass % by an Mn content in the polygonal ferrite in mass % equals 2.0 or more.

[2] The high-strength steel sheet according to [1], wherein the chemical composition further contains, in mass %, at least one selected from the group consisting of Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.000% or less, V: 0.005% or more and 0.500% or less, Mo: 0.005% or more and 1.000% or less, Cu: 0.005% or more and 1.000% or less, Sn: 0.002% or more and 0.200% or less, Sb: 0.002% or more and 0.200% or less, Ta: 0.001% or more and 0.010% or less, Ca: 0.0005% or more and 0.0050% or less, Mg: 0.0005% or more and 0.0050% or less, and REM: 0.0005% or more and 0.0050% or less.

[3] The high-strength steel sheet according to [1] or [2], wherein the retained austenite has a C content that satisfies the following formula in relation to the Mn content in the retained austenite:

$$0.09*[\text{Mn content}]-0.130-0.140 \leq [\text{C content}] \leq 0.09*[\text{Mn content}]-0.130+0.140$$

where

[C content] is the C content in the retained austenite in mass %, and

[Mn content] is the Mn content in the retained austenite in mass %.

[4] The high-strength steel sheet according to any one of [1] to [3], wherein when the steel sheet is subjected to tensile working with an elongation value of 10%, a value obtained by dividing a volume fraction of the retained austenite after the tensile working by a volume fraction of the retained austenite before the tensile working equals 0.3 or more.

[5] The high-strength steel sheet according to any one of [1] to [4], wherein the steel sheet further comprises a hot-dip galvanized layer.

[6] The high-strength steel sheet according to any one of [1] to [4], wherein the steel sheet further comprises a hot-dip aluminum-coated layer.

[7] The high-strength steel sheet according to any one of [1] to [4], wherein the steel sheet further comprises an electrogalvanized layer.

[8] A method for manufacturing the high-strength steel sheet according to any one of [1] to [7], the method comprising: subjecting a steel slab having the chemical composition as recited in [1] or [2] to hot rolling whereby the steel slab is heated to 1100° C. or higher and 1300° C. or lower, hot rolled with a finisher delivery temperature of 750° C. or higher and 1000° C. or lower, and coiled at a mean coiling temperature of 300° C. or higher and 750° C. or lower to obtain a hot-rolled sheet; subjecting the hot-rolled sheet to pickling to remove scales; subjecting the hot-rolled sheet to hot band annealing whereby the hot-rolled sheet is retained in a temperature range of $Ac_1$ transformation temperature+20° C. to $Ac_1$ transformation temperature+120° C. for 600 s to 21,600 s; subjecting the hot-rolled sheet to cold rolling whereby the hot-rolled sheet is cold rolled at a rolling reduction of 30% or more to obtain a cold-rolled sheet; and subjecting the cold-rolled sheet to cold-rolled sheet annealing whereby the cold-rolled sheet is retained in a temperature range of $Ac_1$ transformation temperature to $Ac_1$ transformation temperature+100° C. for more than 900 s to 21,600 s or less, and subsequently cooled.

[9] The method for manufacturing the high-strength steel sheet according to [8], the method further comprising: after the cold-rolled sheet annealing, subjecting the cold-rolled sheet to galvanizing treatment, or to hot-dip galvanizing treatment followed by alloying treatment in a temperature range of 450° C. or higher and 600° C. or lower.

[10] The method for manufacturing the high-strength steel sheet according to [8], the method further comprising: after the cold-rolled sheet annealing, subjecting the cold-rolled sheet to hot-dip aluminum-coating treatment.

[11] The method for manufacturing the high-strength steel sheet according to [8], the method further comprising: after the cold-rolled sheet annealing, subjecting the cold-rolled sheet to electrogalvanizing treatment.

Advantageous Effect

According to the disclosure, it becomes possible to provide a high-strength steel sheet that exhibits excellent formability and that has YR (yield ratio) of less than 68% and TS (tensile strength) of 590 MPa or more. High-strength steel sheets manufactured with the methods according to the disclosure are highly beneficial in industrial terms, because they can improve fuel efficiency when applied to automobile structural parts, for example, by a reduction in the weight of automotive bodies.

DETAILED DESCRIPTION

Figure 1:
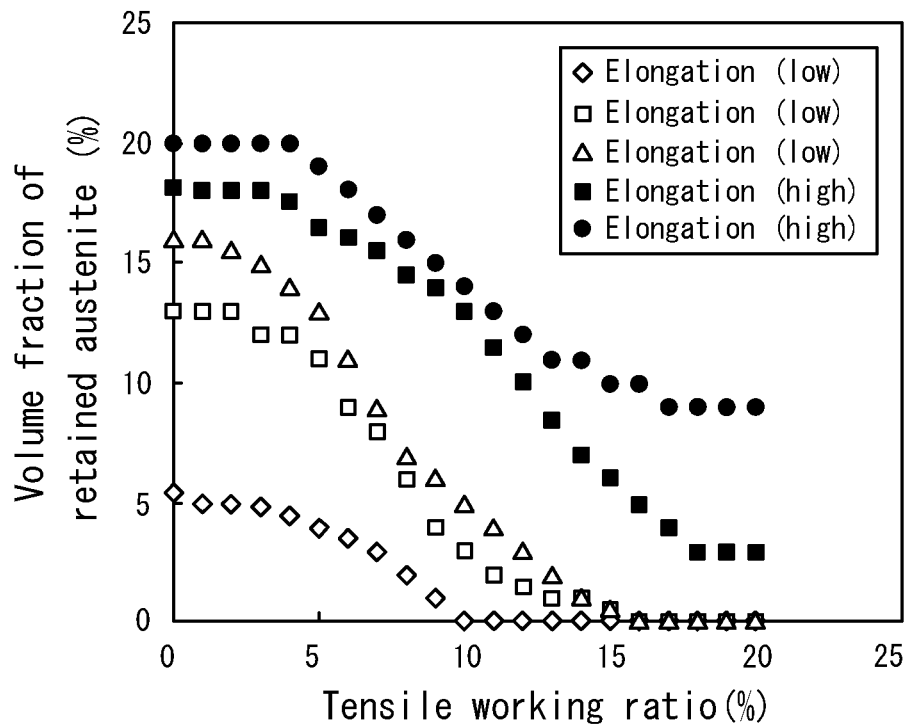
FIG. 1 illustrates the relationship between the working ratio of tensile working and the volume fraction of retained austenite.

The following describes the present disclosure in detail. First, the chemical composition of the high-strength steel sheet according to the disclosure is described.

The % representations below indicating the chemical composition are in mass % unless stated otherwise.

C: 0.030% or More and 0.250% or Less

C is an element necessary for causing a low-temperature transformation phase such as martensite to increase strength. C is also a useful element for increasing the stability of retained austenite and the ductility of steel.

If the C content is less than 0.030%, it is difficult to ensure a desired area ratio of martensite, and desired strength is not obtained. It is also difficult to guarantee a sufficient volume fraction of retained austenite, and good ductility is not obtained. On the other hand, if C is excessively added to the steel beyond 0.250%, hard martensite excessively increases in area ratio, which causes more microvoids at grain boundaries of martensite. This facilitates propagation of cracks during bend test and hole expansion test, leading to a reduction in bendability and stretch flangeability. Moreover, hardening of welds and the heat-affected zone (HAZ) becomes significant and the mechanical properties of the welds deteriorate, leading to a reduction in spot weldability, arc weldability, and the like.

From these perspectives, the C content is 0.030% or more and 0.250% or less. The C content is preferably 0.080% or more. The C content is preferably 0.200% or less.

Si: 0.01% or More and 3.00% or Less

Si is an element that improves the strain hardenability of ferrite, and is thus a useful element for ensuring good ductility. However, if the Si content is less than 0.01%, the addition effect is limited. Thus the lower limit is 0.01%. On the other hand, excessively adding Si beyond 3.00% not only embrittles the steel, but also causes red scales or the like to deteriorate surface characteristics. Therefore, the Si content is 0.01% or more and 3.00% or less. The Si content is preferably 0.20% or more. The Si content is preferably 2.00% or less.

Mn: 2.60% or More and 4.20% or Less

Mn is one of the very important elements for the disclosure. Mn is an element that stabilizes retained austenite, and is a useful element for ensuring good ductility, and for increasing the strength of the steel through solid solution strengthening. These effects can be obtained when the Mn content in steel is 2.60% or more. On the other hand, excessively adding Mn beyond 4.20% results in a rise in cost. From these perspectives, the Mn content is 2.60% or more and 4.20% or less. The Mn content is preferably 3.00% or more.

P: 0.001% or More and 0.100% or Less

P is an element that has a solid solution strengthening effect and can be added depending on the desired strength. P also facilitates ferrite transformation, and thus is a useful element for forming a multi-phase structure in the steel sheet. To obtain this effect, the P content needs to be 0.001% or more. If the P content exceeds 0.100%, however, weldability degrades. When a galvanized layer is subjected to alloying treatment, the alloying rate decreases, impairing galvanizing quality. Therefore, the P content is 0.001% or more and 0.100% or less. The P content is preferably 0.005% or more. The P content is preferably 0.050% or less.

S: 0.0001% or More and 0.0200% or Less

S segregates to grain boundaries, embrittles the steel during hot working, and forms sulfides to reduce the local deformability of the steel sheet. Therefore, the S content is 0.0200% or less, preferably 0.0100% or less, and more preferably 0.0050% or less. Under production constraints, however, the S content is 0.0001% or more. Therefore, the S content is 0.0001% or more and 0.0200% or less. The S content is preferably 0.0001% or more. The S content is preferably 0.0100% or less. The S content is more preferably 0.0001% or more. The S content is more preferably 0.0050% or less.

N: 0.0005% or More and 0.0100% or Less

N is an element that deteriorates the anti-aging property of the steel. The deterioration in anti-aging property becomes more pronounced, particularly when the N content exceeds 0.0100%. Smaller N contents are thus more preferable. However, under production constraints, the N content is 0.0005% or more. Therefore, the N content is 0.0005% or more and 0.0100% or less. The N content is preferably 0.0010% or more. The N content is preferably 0.0070% or less.

Ti: 0.003% or More and 0.200% or Less

Ti is one of the very important elements for the disclosure. Ti is useful for achieving strengthening by precipitation of the steel, and this effect can be obtained when the Ti content is 0.003% or more. However, if the Ti content exceeds 0.200%, hard martensite excessively increases in area ratio, which causes more microvoids at grain boundaries of martensite. This facilitates propagation of cracks during bend test and hole expansion test, leading to a reduction in the bendability and stretch flangeability of the steel sheet. Therefore, the Ti content is 0.003% or more and 0.200% or less. The Ti content is preferably 0.010% or more and 0.100% or less.

The chemical composition of the steel may further contain at least one selected from the group consisting of Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.000% or less, V: 0.005% or more and 0.500% or less, Mo: 0.005% or more and 1.000% or less, Cu: 0.005% or more and 1.000% or less, Sn: 0.002% or more and 0.200% or less, Sb: 0.002% or more and 0.200% or less, Ta: 0.001% or more and 0.010% or less, Ca: 0.0005% or more and 0.0050% or less, Mg: 0.0005% or more and 0.0050% or less, and REM: 0.0005% or more and 0.0050% or less.

Al: 0.01% or More and 2.00% or Less

Al is a useful element for increasing the area of a ferrite-austenite dual phase region and reducing annealing temperature dependency, i.e., increasing the stability of the steel sheet as a material. In addition, Al acts as a deoxidizer, and is also a useful element for the cleanliness of the steel. If the Al content is below 0.01%, however, the addition effect is limited. Thus the lower limit is 0.01%. On the other hand, excessively adding Al beyond 2.00% increases the risk of cracking occurring in a semi-finished product during continuous casting, and inhibits manufacturability. Therefore, when added to steel, the Al content is 0.01% or more and 2.00% or less. The Al content is preferably 0.20% or more. The Al content is preferably 1.20% or less.

Nb: 0.005% or More and 0.200% or Less

Nb is useful for achieving strengthening by precipitation of the steel. The addition effect can be obtained when the content is 0.005% or more. However, if the Nb content exceeds 0.200%, hard martensite excessively increases in area ratio, which causes more microvoids at grain boundaries of martensite. This facilitates propagation of cracks during bend test and hole expansion test, leading to a reduction in bendability and stretch flangeability. This also increases cost. Therefore, when added to steel, the Nb content is 0.005% or more and 0.200% or less. The Nb content is preferably 0.010% or more. The Nb content is preferably 0.100% or less.

B: 0.0003% or More and 0.0050% or Less

B may be added as necessary, since it has the effect of suppressing the generation and growth of ferrite from austenite grain boundaries and enables microstructure control according to the circumstances. The addition effect can be obtained when the B content is 0.0003% or more. If the B content exceeds 0.0050%, however, formability degrades. Therefore, when added to steel, the B content is 0.0003% or more and 0.0050% or less. The B content is preferably 0.0005% or more. The B content is preferably 0.0030% or less.

Ni: 0.005% or More and 1.000% or Less

Ni is an element that stabilizes retained austenite, and is a useful element for ensuring good ductility, and for increasing the strength of the steel through solid solution strengthening. The addition effect can be obtained when the Ni content is 0.005% or more. On the other hand, if the Ni content in the steel exceeds 1.000%, hard martensite excessively increases in area ratio, which causes more microvoids at grain boundaries of martensite. This facilitates propagation of cracks during bend test and hole expansion test, leading to a reduction in bendability and stretch flangeability. This also increases cost. Therefore, when added to steel, the Ni content is 0.005% or more and 1.000% or less.

Cr: 0.005% or More and 1.000% or Less, V: 0.005% or More and 0.500% or Less, Mo: 0.005% or More and 1.000% or Less Cr, V, and Mo are elements that may be added as necessary, since they have the effect of improving the balance between strength and ductility. The addition effect can be obtained when the Cr content is 0.005% or more, the V content is 0.005% or more, and/or the Mo content is 0.005% or more. However, if the Cr content exceeds 1.000%, the V content exceeds 0.500%, and/or the Mo content exceeds 1.000%, hard martensite excessively increases in area ratio, which causes more microvoids at grain boundaries of martensite. This facilitates propagation of cracks during bend test and hole expansion test, leading to a reduction in bendability and stretch flangeability. This also increases cost. Therefore, when added to steel, the Cr content is 0.005% or more and 1.000% or less, the V content is 0.005% or more and 0.500% or less, and/or the Mo content is 0.005% or more and 1.000% or less.

Cu: 0.005% or More and 1.000% or Less

Cu is a useful element for strengthening of steel and may be added for strengthening of steel, as long as the content is within the range disclosed herein. The addition effect can be obtained when the Cu content is 0.005% or more. On the other hand, if the Cu content exceeds 1.000%, hard martensite excessively increases in area ratio, which causes more microvoids at grain boundaries of martensite. This facilitates propagation of cracks during bend test and hole expansion test, leading to a reduction in bendability and stretch flangeability. Therefore, when added to steel, the Cu content is 0.005% or more and 1.000% or less.

Sn: 0.002% or More and 0.200% or Less, Sb: 0.002% or More and 0.200% or Less

Sn and Sb are elements that may be added as necessary from the perspective of suppressing decarbonization of a region extending from the surface layer of the steel sheet to a depth of about several tens of micrometers, which results from nitriding and/or oxidation of the steel sheet surface. Suppressing nitriding and/or oxidation in this way may prevent a reduction in the area ratio of martensite in the steel sheet surface. Therefore, Sn and Sb are useful for ensuring the strength of the steel sheet and the stability as a material. However, excessively adding Sn or Sb beyond 0.200% reduces toughness. Therefore, when Sn and/or Sb is added to steel, the content of each added element is 0.002% or more and 0.200% or less.

Ta: 0.001% or More and 0.010% or Less

Ta forms alloy carbides or alloy carbonitrides, and contributes to increasing the strength of the steel, as is the case with Ti and Nb. It is also believed that Ta has the effect of effectively suppressing coarsening of precipitates when partially dissolved in Nb carbides or Nb carbonitrides to form complex precipitates, such as (Nb, Ta) (C, N), and providing a stable contribution to increasing the strength of the steel sheet through strengthening by precipitation. Therefore, Ta is preferably added to the steel. The above-described precipitate stabilizing effect can be obtained when the Ta content is 0.001% or more. Excessively adding Ta, however, fails to increase the addition effect, but instead results in a rise in alloying cost. Therefore, when added to steel, the Ta content is 0.001% or more and 0.010% or less.

Ca: 0.0005% or More and 0.0050% or Less, Mg: 0.0005% or More and 0.0050% or Less, and REM: 0.0005% or More and 0.0050% or Less Ca, Mg, and REM are useful elements for causing spheroidization of sulfides and mitigating the adverse effect of sulfides on hole expansion formability (stretch flangeability). To obtain this effect, it is necessary to add any of these elements to steel in an amount of 0.0005% or more. However, if the content of each added element exceeds 0.0050%, more inclusions occur, for example, and some defects such as surface defects and internal defects are caused in the steel sheet. Therefore, when Ca, Mg, and/or REM is added to steel, the content of each added element is 0.0005% or more and 0.0050% or less.

The balance other than the above components consists of Fe and incidental impurities.

The following provides a description of the microstructure of the high-strength steel sheet according to the disclosure.

Area Ratio of Polygonal Ferrite: 35% or More and 80% or Less

In the high-strength steel sheet according to the disclosure, the area ratio of polygonal ferrite needs to be 35% or more to ensure sufficient ductility. On the other hand, to guarantee TS of 590 MPa or more, the area ratio of soft polygonal ferrite needs to be 80% or less. The area ratio of polygonal ferrite is preferably 40% or more. The area ratio of polygonal ferrite is preferably 75% or less. As used herein, "polygonal ferrite" refers to ferrite that is relatively soft and has high ductility.

Area Ratio of Martensite: 5% or More and 25% or Less

To achieve TS of 590 MPa or more, the area ratio of martensite needs to be 5% or more. On the other hand, to ensure good ductility, the area ratio of martensite needs to be 25% or less. The area ratio of martensite is preferably 8% or more. The area ratio of martensite is preferably 20% or less.

The area ratios of polygonal ferrite and martensite can be determined in the following way.

Specifically, a cross section of a steel sheet that is taken in the sheet thickness direction to be parallel to the rolling direction (which is an L-cross section) is polished, then etched with 3 vol. % nital, and ten locations are observed at 2000 times magnification under an SEM (scanning electron microscope), at a position of sheet thickness×¼ (which is the position at a depth of one-fourth of the sheet thickness from the steel sheet surface), to capture microstructure micrographs. The captured microstructure micrographs are used to calculate the area ratios of respective phases (polygonal ferrite and martensite) for the ten locations using Image-Pro manufactured by Media Cybernetics, the results are then averaged, and each average is used as the area ratio of the corresponding phase. In the microstructure micrographs, polygonal ferrite appears as a gray structure (base steel structure), while martensite as a white structure.

Volume Fraction of Retained Austenite: 8% or More

According to the disclosure, the volume fraction of retained austenite needs to be 8% or more, and preferably 10% or more, to ensure sufficient ductility. No upper limit is placed on the volume fraction of retained austenite, yet a preferred upper limit is around 60%, considering the risk of formation of increased amounts of retained austenite that is less effective in improving ductility, i.e., so-called unstable retained austenite resulting from insufficient concentration of C, Mn, and the like. A more preferred upper limit is 50% or less.

The volume fraction of retained austenite is calculated by determining the x-ray diffraction intensity of a plane of sheet thickness x ¼ (which is the plane at a depth of one-fourth of the sheet thickness from the steel sheet surface), which is exposed by polishing the steel sheet surface to a depth of one-fourth of the sheet thickness. Using an incident x-ray beam of MoKα, the intensity ratio of the peak integrated intensity of the {111}, {200}, {220}, and {311} planes of retained austenite to the peak integrated intensity of the {110}, {200}, and {211} planes of ferrite is calculated for all of the twelve combinations, the results are then averaged, and the average is used as the volume fraction of retained austenite.

Mean Grain Size of Polygonal Ferrite: 6 μm or Less

Refinement of polygonal ferrite grains contributes to improving TS (tensile strength), as well as bendability and stretch flangeability (hole expansion formability). To ensure a desired TS as well as high bendability and high stretch flangeability (high hole expansion formability), the mean grain size of polygonal ferrite needs to be 6 μm or less, and preferably 5 μm or less.

Herein, no lower limit is placed on the mean grain size of polygonal ferrite, yet, from an industrial perspective, a preferred lower limit is around 0.3 μm.

Mean Grain Size of Martensite: 3 μm or Less

Refinement of martensite grains contributes to improving bendability and stretch flangeability (hole expansion formability). To ensure high bendability and high stretch flangeability (high hole expansion formability), the mean grain size of martensite needs to be 3 μm or less, preferably 2.5 μm or less.

Herein, no lower limit is placed on the mean grain size of martensite, yet, from an industrial perspective, a preferred lower limit is around 0.1 μm.

Mean Grain Size of Retained Austenite: 3 μm or Less

Refinement of retained austenite grains contributes to improving ductility, as well as bendability and stretch flangeability (hole expansion formability). To ensure good ductility, bendability, and stretch flangeability (hole expansion formability), the mean grain size of retained austenite needs to be 3 μm or less, and preferably 2.5 μm or less.

Herein, no lower limit is placed on the mean grain size of retained austenite, yet, from an industrial perspective, a preferred lower limit is around 0.1 μm.

The mean grain sizes of polygonal ferrite, martensite, and retained austenite are respectively determined by averaging the results from calculating equivalent circular diameters from the areas of polygonal ferrite grains, martensite grains, and retained austenite grains, which can be measured from the microstructure micrographs obtained in a similar manner to that used for the area ratios using Image-Pro as mentioned above. Martensite and retained austenite are identified using an EBSD (Electron Backscatter Diffraction) phase map.

In this case, each of the above-described mean grain sizes is determined from the measurements for grains with a grain size of 0.01 μm or more.

Mean Grain Aspect Ratio of Each of Polygonal Ferrite, Martensite, and Retained Austenite: 2.0 or Less In this disclosure, it is very important that polygonal ferrite, martensite, and retained austenite each have a mean grain aspect ratio of 2.0 or less.

Specifically, if grains have a low aspect ratio, this means that grain growth in ferrite and austenite occurred after recovery and recrystallization during a retaining process in the post-cold-rolling heat treatment (cold-rolled sheet annealing), and nearly equiaxed grains formed. Such grains with low aspect ratio greatly contributes to lowering YR (yield ratio). Microstructures composed of such grains are resistant to microvoids, and can suppress growth of cracks during bend test and hole expansion test by causing cracks to propagate in different directions. This also contributes to improvement of bendability and stretch flangeability.

Therefore, the mean grain aspect ratio of polygonal ferrite, martensite, and retained austenite are each adjusted to 2.0 or less, preferably 1.8 or less, and more preferably 1.6 or less.

No lower limit is placed on the mean grain aspect ratio of polygonal ferrite, martensite, or retained austenite, yet a preferred lower limit is around 1.1.

As used herein, "grain aspect ratio" refers to a value obtained by dividing the length of the major axis of the grain by the length of the minor axis, and the mean grain aspect ratio of each phase can be determined in the following way.

The mean grain aspect ratios of polygonal ferrite, martensite, and retained austenite are respectively determined by averaging the results from calculating the lengths of the major and minor axes of polygonal ferrite grains, martensite grains, and retained austenite grains, 30 grains each, which can be measured from the microstructure micrographs obtained in a similar manner to that used for the area ratios using Image-Pro as mentioned above, and dividing, for each grain, the length of the major axis by the length of the minor axis.

A value Obtained by Dividing the Mn Content in the Retained Austenite (in mass %) by the Mn Content in the Polygonal Ferrite (in Mass %): 2.0 or More In this disclosure, it is very important that the value obtained by dividing the Mn content in the retained austenite (in mass %) by the Mn content in the polygonal ferrite (in mass %) equals 2.0 or more. The reason is that better ductility requires a larger amount of stable retained austenite with concentrated Mn.

No upper limit is placed on the value obtained by dividing the Mn content in the retained austenite (in mass %) by the Mn content in the polygonal ferrite (in mass %), yet, from the perspective of stretch flangeability, a preferred upper limit is around 16.0.

The Mn contents in the retained austenite and in the polygonal ferrite can be determined in the following way.

Specifically, an EPMA (Electron Probe Micro Analyzer) is used to quantify the distribution of Mn in each phase in a cross section along the rolling direction at a position of sheet thickness x ¼. Then, 30 retained austenite grains and 30 polygonal ferrite grains are analyzed to determine respective Mn contents, the results are then averaged, and each average is used as the Mn content in the corresponding phase.

In addition to the polygonal ferrite, martensite, and retained austenite, the microstructure of the high-strength steel sheet according to the disclosure may include carbides such as granular ferrite, acicular ferrite, bainitic ferrite, tempered martensite, pearlite, and cementite (excluding cementite in pearlite). Any of these structures may be included as long as the total area ratio is 10% or less, without impairing the effect of the disclosure.

In the high-strength steel sheet according to the disclosure, it is preferable that the retained austenite has a C content that satisfies the following formula in relation to the Mn content in the retained austenite:

$$0.09*[\text{Mn content}]-0.130-0.140 \leq [\text{C content}] \leq 0.09*[\text{Mn content}]-0.130+0.140$$

where

[C content] is the C content in the retained austenite in mass %, and

[Mn content] is the Mn content in the retained austenite in mass %.

Here, retained austenite transforms into martensite through a TRIP phenomenon upon working, and good elongation can be secured by this transformation. In other words, a TRIP phenomenon requires the presence of retained austenite before press forming or working. Retained austenite is a phase that tends to remain when the Ms point (martensitic transformation starting temperature), which is determined by the component elements contained in the steel microstructure, is low (for example, as low as about 15° C. or less).

To further investigate the transformation behavior of retained austenite due to the TRIP phenomenon, we conducted a thorough investigation on the steel microstructures of steel sheets after subjection to press forming and working.

As a result, it was discovered that there are two types of retained austenite present in steel: one transforms martensite immediately upon the subjection of the steel sheet to press forming or working (which is so-called unstable retained austenite), while the other persists until the working ratio becomes high enough to cause the retained austenite to transform to martensite, bringing about a TRIP phenomenon (which is so-called stable retained austenite). It was also revealed that good elongation can be obtained in a particularly effective way in the presence of a large amount of so-called stable retained austenite, which transforms to martensite after the working ratio becomes high enough.

Specifically, from among various steel sheets, those with good elongation and those with low elongation were selected, and these steel sheets were subjected to tensile working by varying the working ratio from 0% to 20%, and measurement was made of the volume fraction of retained austenite remaining on each steel sheet after subjection to tensile working. We investigated the relationship between the working ratio of each steel sheet and the volume fraction of retained austenite in the steel sheet after subjection to tensile working, and as a result found the tendency as illustrated in FIG. 1.

It can be seen from FIG. 1 that the samples with good elongation each showed a gentle decrease in the quantity of retained austenite as the working ratio increased. As used herein, "the working ratio" refers to the elongation value that is determined from a tensile test performed on a JIS No. 5 test piece sampled from a steel sheet with the tensile direction being perpendicular to the rolling direction of the steel sheet.

Then, we prepared various steel sheets of TS 780 MPa grade, and subjected the steel sheets to tensile working with an elongation value of 10%, and measured the volume fraction of retained austenite in each steel sheet after subjection to the tensile working. The volume fraction of retained austenite was measured in accordance with the above procedure.

Then, we examined the effect that a value obtained by dividing the volume fraction of retained austenite remaining in each steel sheet after subjection to 10% tensile working by the volume fraction of retained austenite before the tensile working ([volume fraction of retained austenite in a steel sheet after subjection to tensile working with an elongation value of 10%]/[volume fraction of retained austenite before the tensile working]) has on the elongation of the steel sheet. The results are shown in FIG. 2.

The following provides details of conditions for imparting the above-described tensile working with an elongation value of 10%.

A tensile test was performed using a JIS No. 5 test piece sampled from a steel sheet with the tensile direction being perpendicular to the rolling direction of the steel sheet, and the test was interrupted when the elongation value of the test piece reached 10%. In this way, tensile working with an elongation value of 10% is achieved.

Figure 2:
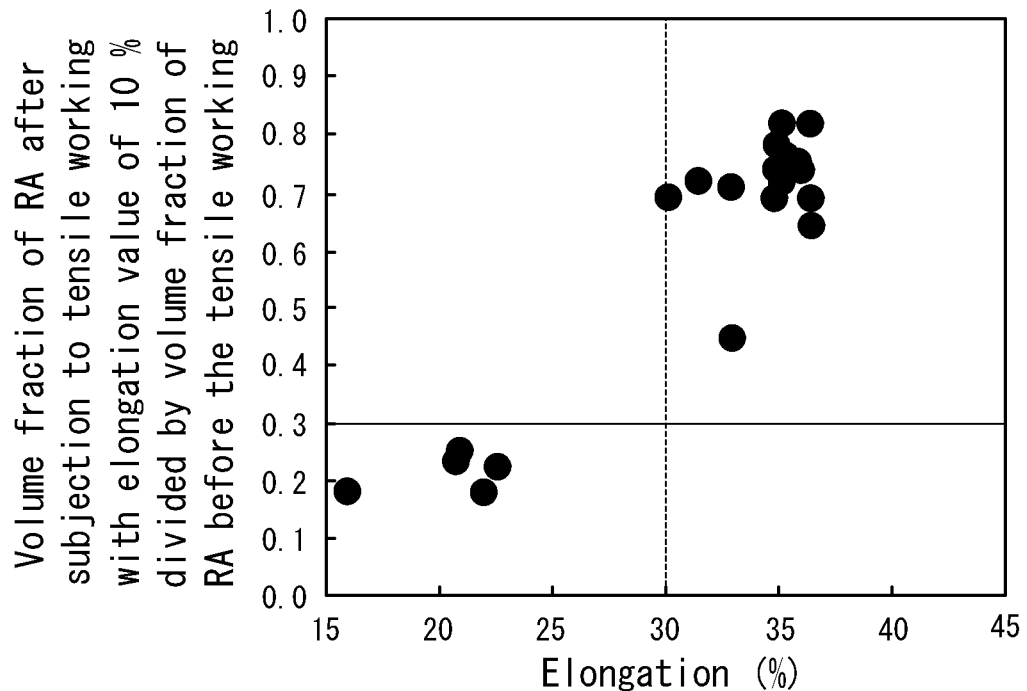
FIG. 2 illustrates the relationship between the elongation of each steel sheet and the value obtained by dividing the volume fraction of retained austenite remaining in the steel sheet after subjection to tensile working with an elongation value of 10% by the volume fraction of retained austenite before the tensile working.

In FIG. 2, the elongation of each steel sheet is the total elongation determined by performing a tensile test on the steel sheet before subjection to tensile working in the same manner as in Examples described later.

As shown in FIG. 2, steel sheets exhibit high elongation if the value obtained by dividing the volume fraction of retained austenite in a steel sheet after subjection to tensile working with an elongation value of 10% by the volume fraction of retained austenite before the tensile working is 0.3 or more, whereas those outside this range have low elongation.

It is thus preferable that the value obtained by dividing the volume fraction of retained austenite in a steel sheet after subjection to tensile working with an elongation value of 10% by the volume fraction of retained austenite before the tensile working is adjusted to be 0.3 or more.

As a result of further investigations on the steel microstructures of steel sheets satisfying the above conditions before subjection to tensile working, we discovered that a TRIP phenomenon providing high strain hardenability occurs upon working and even better elongation can be achieved if the C content and the Mn content in the retained austenite satisfy the following relation:

$$0.09*[\text{Mn content}]-0.130-0.140 \leq [\text{C content}] \leq 0.09*[\text{Mn content}]-0.130+0.140$$

where

[C content] is the C content in the retained austenite in mass %, and

[Mn content] is the Mn content in the retained austenite in mass %.

In other words, by controlling the C content in the retained austenite appropriately in relation to the Mn content in the retained austenite, it is possible to guarantee the generation of a large amount of so-called stable retained austenite, which causes a transformation induced plasticity (TRIP) phenomenon, a key factor of improving ductility, to occur intermittently up until the final stage of working performed on the steel sheet. As a result, high strength and even better elongation can be achieved.

The C content in the retained austenite (in mass %) can be determined in the following way as in the Mn content in the retained austenite.

Specifically, an EPMA is used to quantify the distribution of C in each phase in a cross section along the rolling direction at a position of sheet thickness x ¼. Then, 30 retained austenite grains are analyzed to determine respective C contents, the results are averaged, and the average is used as the C content.

The following describes a method for manufacturing the high-strength steel sheet according to the disclosure.

The method for manufacturing a high-strength steel sheet according to the disclosure, the method comprising: subjecting a steel slab having the above-described chemical composition to hot rolling whereby the steel slab is heated to 1100° C. or higher and 1300° C. or lower, hot rolled with a finisher delivery temperature of 750° C. or higher and 1000° C. or lower, and coiled at a mean coiling temperature of 300° C. or higher and 750° C. or lower to obtain a hot-rolled sheet; subjecting the hot-rolled sheet to pickling to remove scales; subjecting the hot-rolled sheet to hot band annealing whereby the hot-rolled sheet is retained in a temperature range of $Ac_1$ transformation temperature+20° C. to $Ac_1$ transformation temperature+120° C. for 600 s to 21,600 s; subjecting the hot-rolled sheet to cold rolling whereby the hot-rolled sheet is cold rolled at a rolling reduction of 30% or more to obtain a cold-rolled sheet; and subjecting the cold-rolled sheet to cold-rolled sheet annealing whereby the cold-rolled sheet is retained in a temperature range of $Ac_1$ transformation temperature to $Ac_1$ transformation temperature+100° C. for more than 900 s to 21,600 s or less, and subsequently cooled.

The following explains the reasons for the limitations placed on the manufacturing conditions.

Steel Slab Heating Temperature: 1100° C. or Higher and 1300° C. or Lower

Precipitates that are present at the time of heating of a steel slab will remain as coarse precipitates in the resulting steel sheet, making no contribution to strength. Thus, remelting of any Ti- and Nb-based precipitates precipitated during casting is required.

In this respect, if the steel slab is heated at a temperature below 1100° C., it is difficult to cause sufficient melting of carbides, leading to problems such as an increased risk of trouble during hot rolling resulting from increased rolling load. Therefore, the steel slab heating temperature needs to be 1100° C. or higher.

In addition, from the perspective of obtaining a smooth steel sheet surface by scaling-off defects in the surface layer of the slab, such as blow hole generation, segregation, and the like, and reducing cracks and irregularities over the steel sheet surface, the steel slab heating temperature needs to be 1100° C. or higher.

If the steel slab heating temperature exceeds 1300° C., however, scale loss increases as oxidation progresses. Therefore, the steel slab heating temperature needs to be 1300° C. or lower.

For this reason, the steel slab heating temperature is 1100° C. or higher and 1300° C. or lower. The steel slab heating temperature is preferably 1150° C. or higher. The steel slab heating temperature is preferably 1250° C. or lower.

A steel slab is preferably made with continuous casting to prevent macro segregation, yet may be produced with other methods such as ingot casting or thin slab casting. The steel slab thus produced may be cooled to room temperature and then heated again according to the conventional method. Moreover, after the production of the steel slab, energy-saving processes are applicable without any problem, such as hot direct rolling or direct rolling in which either a warm steel slab without being fully cooled to room temperature is charged into a heating furnace, or a steel slab is hot rolled immediately after being subjected to heat retaining for a short period. Further, a steel slab is subjected to rough rolling under normal conditions and formed into a sheet bar. When the heating temperature is low, the sheet bar is preferably heated using a bar heater or the like prior to finish rolling from the viewpoint of preventing troubles during hot rolling.

Finisher Delivery Temperature in Hot Rolling: 750° C. or Higher and 1000° C. or Lower The heated steel slab is hot rolled through rough rolling and finish rolling to form a hot-rolled sheet. At this point, when the finisher delivery temperature exceeds 1000° C., the amount of oxides (scales) generated suddenly increases and the interface between the steel substrate and oxides becomes rough, which tends to impair the surface quality of the steel sheet after subjection to pickling and cold rolling. In addition, any hot-rolling scales remaining after pickling adversely affect ductility and stretch flangeability. Moreover, grain size is excessively coarsened, causing surface deterioration in a pressed part during working.

On the other hand, if the finisher delivery temperature is below 750° C., rolling load and burden increase, and rolling is performed more often with austenite in a non-recrystallized state. As a result, an abnormal texture develops in the steel sheet, and the final product has a significant planar anisotropy such that the material properties not only become less uniform, but the ductility itself also deteriorates.

Therefore, the finisher delivery temperature in hot rolling needs to be in a range of 750° C. to 1000° C. The finisher delivery temperature is preferably 800° C. or higher. The finisher delivery temperature is preferably 950° C. or lower.

Mean Coiling Temperature After Hot Rolling: 300° C. or Higher and 750° C. or Lower When the mean coiling temperature after the hot rolling is above 750° C., the grain size of ferrite in the microstructure of the hot-rolled sheet increases, making it difficult to ensure a desired strength. On the other hand, when the mean coiling temperature after the hot rolling is below 300° C., there is an increase in the strength of the hot-rolled sheet and in the rolling load for cold rolling, and the steel sheet suffers malformation. As a result, productivity decreases. Therefore, the mean coiling temperature after the hot rolling needs to be 300° C. or higher and 750° C. or lower. The mean coiling temperature is preferably 400° C. or higher. The mean coiling temperature is preferably 650° C. or lower.

Finish rolling may be performed continuously by joining rough-rolled sheets during the hot rolling. Rough-rolled sheets may be coiled on a temporary basis. At least part of finish rolling may be conducted as lubrication rolling to reduce rolling load in the hot rolling. Conducting lubrication rolling in such a manner is effective from the perspective of making the shape and material properties of the steel sheet uniform. In lubrication rolling, the coefficient of friction is preferably 0.10 or more. The coefficient of friction is preferably 0.25 or less.

The hot-rolled steel sheet thus produced is subjected to pickling. Pickling enables removal of oxides (scales) from the steel sheet surface, and is thus important to ensure that the high-strength steel sheet as the final product has good chemical convertibility and a sufficient quality of coating. Pickling may be performed in one or more batches.

Hot Band Annealing (Heat Treatment) Conditions: To Retain in a Temperature Range of $Ac_1$ Transformation Temperature+20° C. to $Ac_1$ Transformation Temperature+120° C. for 600 s to 21,600 s In the hot band annealing according to the disclosure, it is very important to retain the steel sheet in a temperature range of $Ac_1$ transformation temperature+20° C. to $Ac_1$ transformation temperature+120° C. for 600 s to 21,600 s.

Specifically, if the hot band annealing is performed at an annealing temperature (holding temperature) below $Ac_1$ transformation temperature+20° C. or above $Ac_1$ transformation temperature+120° C., or if the holding time is shorter than 600 s, concentration of Mn in austenite does not proceed in either case, making it difficult to ensure a sufficient amount of retained austenite remaining after the final annealing (cold-rolled sheet annealing). As a result, ductility decreases. On the other hand, if the holding time is longer than 21,600 s, concentration of Mn in austenite reaches a plateau, and becomes less effective in improving the ductility of the steel sheet after subjection to the final annealing, resulting in a rise in costs.

Retaining the steel sheet in the temperature range of $Ac_1$ transformation temperature+20° C. to $Ac_1$ transformation temperature+120° C. for 600 s to 21,600 s is also important from the perspective of ensuring that the steel microstructure has a C content in the retained austenite that satisfies the following formula in relation to the Mn content in the retained austenite:

$$0.09*[\text{Mn content}]-0.130-0.140 \leq [\text{C content}] \leq 0.09*[\text{Mn content}]-0.130+0.140$$

where

[C content] is the C content in the retained austenite in mass %, and

[Mn content] is the Mn content in the retained austenite in mass %.

Therefore, in the hot band annealing, the steel sheet is retained in the temperature range of $Ac_1$ transformation temperature+20° C. to $Ac_1$ transformation temperature+120° C. (preferably $Ac_1$ transformation temperature+30° C. or higher, and preferably $Ac_1$ transformation temperature+100° C. or lower) for 600 s to 21,600 s (preferably for 1000 s or more, and preferably for 18,000 s or less).

The above-described heat treatment process may be continuous annealing or batch annealing. After the above-described heat treatment, the steel sheet is cooled to room temperature. The cooling process and cooling rate are not particularly limited, however, and any type of cooling may be performed, including furnace cooling and air cooling in batch annealing and gas jet cooling, mist cooling, and water cooling in continuous annealing.

The pickling may be performed according to a conventional process.

Rolling Reduction in Cold Rolling: 30% or More

The cold rolling according to the disclosure is performed at a rolling reduction of 30% or more. By performing the cold rolling at a rolling reduction of 30% or more, fine austenite is formed during heat treatment. As a result, fine retained austenite and martensite are formed in the steel sheet, improving not only the balance between strength and ductility, but also bendability and stretch flangeability (hole expansion formability).

No upper limit is placed on the rolling reduction in the cold rolling according to the disclosure, yet a preferred upper limit is around 85% from the perspective of cold rolling load.

Cold-Rolled Sheet Annealing (Heat Treatment) Conditions: To Retain in a Temperature Range of $Ac_1$ Transformation Temperature to $Ac_1$ Transformation Temperature+100° C. for More than 900 s to 21,600 s or Less In the cold-rolled sheet annealing according to the disclosure, it is very important to retain the steel sheet in a temperature range of $Ac_1$ transformation temperature to $Ac_1$ transformation temperature+100° C. for more than 900 s to 21,600 s or less.

Specifically, if the annealing temperature (holding temperature) at which the cold-rolled sheet is annealed is below $Ac_1$ transformation temperature or above $Ac_1$ transformation temperature+100° C., concentration of Mn in austenite does not proceed, making it difficult to ensure a sufficient amount of retained austenite. As a result, ductility decreases.

Additionally, if the holding time is 900 s or less, non-crystallized ferrite persists, and the interfaces between different phases, namely, between ferrite and hard secondary phases (martensite and retained austenite), are reduced, leading to an increased mean grain aspect ratio of the constituent phases. This results in an increase in YP (yield strength) and in YR (yield ratio). On the other hand, if the holding time is longer than 21,600 s, concentration of Mn in austenite reaches a plateau, and becomes less effective in improving the ductility of the steel sheet after subjection to the final annealing (cold-rolled sheet annealing), resulting in a rise in costs.

Therefore, in the cold-rolled sheet annealing, the steel sheet is retained in the temperature range of $Ac_1$ transformation temperature to $Ac_1$ transformation temperature+100° C. (preferably $Ac_1$ transformation temperature+20° C. or higher, and preferably $Ac_1$ transformation temperature+80° C. or lower) for more than 900 s to 21,600 s or less (preferably for 1200 s or more, and preferably for 18,000 s or less).

The above-described cold-rolled sheet annealing conditions are also important for ensuring that the steel microstructure has a C content in the retained austenite that satisfies the following formula in relation to the Mn content in the retained austenite:

$$0.09*[\text{Mn content}]-0.130-0.140 \leq [\text{C content}] \leq 0.09*[\text{Mn content}]-0.130+0.140$$

where

[C content] is the C content in the retained austenite in mass %, and

[Mn content] is the Mn content in the retained austenite in mass %.

Among others, a particularly preferred condition is to retain the steel sheet in a temperature range of $Ac_1$ transformation temperature+20° C. to $Ac_1$ transformation temperature+80° C.

In addition, the cold-rolled sheet thus obtained may be subjected to coating or plating treatment, such as hot-dip galvanizing, hot-dip aluminum-coating, or electrogalvanizing, to obtain a high-strength steel sheet having a hot-dip galvanized layer, a hot-dip aluminum-coated layer, or an electrogalvanized layer on its surface. As used herein, "hot-dip galvanizing" includes galvannealing.

For example, when hot-dip galvanizing treatment is performed, the above-described cold-rolled sheet subjected to the cold-rolled sheet annealing is dipped in a galvanizing bath at 440° C. or higher and 500° C. or lower for hot-dip galvanizing treatment, after which coating weight adjustment is performed using gas wiping or the like. For hot-dip galvanizing, a galvanizing bath with an Al content of 0.10 mass % or more and 0.22 mass % or less is preferably used. When a galvanized layer is subjected to alloying treatment, the alloying treatment is performed in a temperature range of 450° C. to 600° C. after the hot-dip galvanizing treatment. If the alloying treatment is performed at a temperature above 600° C., untransformed austenite transforms to pearlite, where the presence of a desired volume fraction of retained austenite cannot be ensured and ductility may degrade. On the other hand, if the alloying treatment is performed at a temperature below 450° C., the alloying process does not proceed, making it difficult to form an alloy layer. Therefore, when a galvanized layer is subjected to alloying treatment, the alloying treatment is preferably performed in a temperature range of 450° C. to 600° C.

Although other manufacturing conditions are not particularly limited, the series of processes including the annealing, hot-dip galvanizing, and alloying treatment described above may preferably be performed in a continuous galvanizing line (CGL), which is a hot-dip galvanizing line, from the perspective of productivity.

When hot-dip aluminum coating treatment is performed, the cold-rolled sheet subjected to the above-described cold-rolled sheet annealing is dipped in an aluminum molten bath at 660° C. to 730° C. for hot-dip aluminum coating treatment, after which coating weight adjustment is performed using gas wiping or the like. In a steel such that the temperature of the aluminum molten bath falls within the temperature range of $Ac_1$ transformation temperature to $Ac_1$ transformation temperature+100° C., finer and more stable retained austenite can be formed in the steel when subjected to hot-dip aluminum coating treatment, and therefore further improvement in ductility can be achieved.

Further, when electrogalvanizing treatment is carried out, it is preferable without limitation to adjust the plating thickness in the range of 5 to 15 μm.

Any of the above-described high-strength steel sheets according to the disclosure may be subjected to skin pass rolling for the purposes of straightening, adjustment of roughness on the sheet surface, and the like. The skin pass rolling is preferably performed at a rolling reduction of 0.1% or more. The skin pass rolling is preferably performed at a rolling reduction of 2.0% or less. A rolling reduction below 0.1% provides only a small effect and complicates control, and hence 0.1% is the lower limit of the favorable range. On the other hand, a rolling reduction above 2.0% significantly degrades productivity, and thus 2.0% is the upper limit of the favorable range.

The skin pass rolling may be performed on-line or off-line. Skin pass may be performed in one or more batches to achieve a target rolling reduction. Moreover, any of the above-described high-strength steel sheets according to the disclosure may be subjected to a variety of coating treatment options, such as those using coating of resin, fats and oils, and the like.

EXAMPLES

Steels having the chemical compositions presented in Table 1, each with the balance consisting of Fe and incidental impurities, were prepared by steelmaking in a converter and formed into slabs by continuous casting. The slabs thus obtained were subjected to hot rolling, pickling, and then hot band annealing, followed by cold rolling and subsequent cold-rolled sheet annealing to form cold-rolled sheets (CR), while varying the conditions as listed in Table 2. Some were further subjected to hot-dip galvanizing treatment (including hot-dip galvanizing treatment followed by alloying treatment), hot-dip aluminum-coating treatment, or electrogalvanizing treatment to form hot-dip galvanized steel sheets (GI), galvannealed steel sheets (GA), hot-dip aluminum-coated steel sheets (Al), or electrogalvanized steel sheets (EG).

Used as hot-dip galvanizing baths were a zinc bath containing 0.19 mass % of Al for GI and a zinc bath containing 0.14 mass % of Al for GA, in each case the bath temperature was 465° C. The coating weight per side was 45 g/m$^2$ (in the case of both-sided coating), and the Fe concentration in the coated layer of each GA was 9 mass % or more and 12 mass % or less. The bath temperature of the hot-dip aluminum molten bath for hot-dip aluminum-coated steel sheets was set at 700° C.

The $Ac_1$ transformation temperature (° C.) presented in Table 1 was calculated by:

$Ac_1$ transformation temperature (° C.)=751−16*(% C)+11*(% Si)−28*(% Mn)−5.5*(% Cu)−16*(% Ni)+13*(% Cr)+3.4*(% Mo)

where (% C), (% Si), (% Mn), (% Cu), (% Ni), (% Cr), and (% Mo) each represent the content in steel (in mass %) of the element in the parentheses.

TABLE 1

| Steel ID | Chemical composition (mass %) | | | | | | | | | | | |
| --- | --- | --- | --- | --- | --- | --- | --- | --- | --- | --- | --- | --- |
| | C | Si | Mn | P | S | N | Ti | Al | Nb | B | Ni | Cr |
| A | 0.123 | 0.32 | 3.26 | 0.020 | 0.0017 | 0.0033 | 0.031 | — | — | — | — | — |
| B | 0.182 | 0.62 | 3.85 | 0.025 | 0.0020 | 0.0035 | 0.019 | — | — | — | — | — |
| C | 0.188 | 1.23 | 4.04 | 0.028 | 0.0019 | 0.0032 | 0.009 | — | — | — | — | — |
| D | 0.092 | 1.54 | 4.01 | 0.021 | 0.0017 | 0.0039 | 0.031 | — | — | — | — | — |
| E | 0.165 | 0.55 | 3.81 | 0.026 | 0.0016 | 0.0040 | 0.010 | — | — | — | — | — |
| F | 0.158 | 0.01 | 3.57 | 0.020 | 0.0025 | 0.0029 | 0.038 | — | — | — | — | — |
| G | 0.122 | 0.85 | 3.98 | 0.026 | 0.0019 | 0.0032 | 0.021 | — | — | — | — | — |
| H | 0.124 | 0.65 | 2.90 | 0.025 | 0.0019 | 0.0032 | 0.041 | — | — | — | — | — |
| I | 0.123 | 0.47 | 3.70 | 0.020 | 0.0024 | 0.0031 | 0.023 | — | — | — | — | — |
| J | 0.022 | 0.47 | 3.85 | 0.028 | 0.0024 | 0.0030 | 0.036 | — | — | — | — | — |
| K | 0.222 | 4.20 | 3.52 | 0.027 | 0.0025 | 0.0032 | 0.023 | — | — | — | — | — |
| L | 0.206 | 0.65 | 2.41 | 0.023 | 0.0027 | 0.0033 | 0.034 | — | — | — | — | — |
| M | 0.192 | 0.59 | 3.84 | 0.024 | 0.0022 | 0.0033 | 0.001 | — | — | — | — | — |
| N | 0.224 | 0.31 | 3.85 | 0.021 | 0.0024 | 0.0036 | 0.031 | 0.44 | — | — | — | — |
| O | 0.202 | 0.87 | 3.70 | 0.027 | 0.0025 | 0.0032 | 0.027 | — | 0.041 | — | — | — |
| P | 0.212 | 0.81 | 3.67 | 0.026 | 0.0021 | 0.0035 | 0.028 | — | — | 0.0016 | — | — |
| Q | 0.223 | 1.2 | 3.62 | 0.027 | 0.0020 | 0.0030 | 0.038 | — | — | — | 0.284 | — |
| R | 0.153 | 0.33 | 4.04 | 0.030 | 0.0020 | 0.0030 | 0.036 | — | — | — | — | 0.346 |
| S | 0.153 | 0.67 | 3.79 | 0.027 | 0.0020 | 0.0030 | 0.032 | — | — | — | — | — |
| T | 0.149 | 0.52 | 3.42 | 0.024 | 0.0023 | 0.0034 | 0.044 | — | — | — | — | — |
| U | 0.122 | 1.43 | 3.15 | 0.030 | 0.0024 | 0.0033 | 0.009 | — | — | — | — | — |
| V | 0.129 | 0.54 | 3.66 | 0.025 | 0.0030 | 0.0032 | 0.040 | — | — | — | — | — |
| W | 0.141 | 0.57 | 3.22 | 0.026 | 0.0020 | 0.0033 | 0.044 | — | — | — | — | — |
| X | 0.218 | 0.67 | 3.62 | 0.028 | 0.0015 | 0.0042 | 0.010 | — | 0.044 | — | — | — |
| Y | 0.224 | 0.41 | 3.26 | 0.026 | 0.0025 | 0.0035 | 0.036 | — | 0.051 | — | — | — |
| Z | 0.233 | 0.27 | 3.79 | 0.025 | 0.0023 | 0.0042 | 0.023 | — | 0.041 | — | — | — |
| AA | 0.234 | 0.95 | 4.05 | 0.030 | 0.0026 | 0.0043 | 0.015 | — | — | — | — | — |
| AB | 0.219 | 1.26 | 3.88 | 0.031 | 0.0027 | 0.0039 | 0.023 | — | — | — | — | — |

TABLE 1-continued

| Steel ID | | | | | | | | Chemical composition (mass %) | | | | | Ac₁ transformation temperature (° C.) | Remarks |
|---|---|---|---|---|---|---|---|---|---|---|---|---|---|---|
| AC | 0.215 | 1.22 | 4.15 | 0.028 | 0.0022 | 0.0031 | 0.035 | — | — | — | — | — | | |
| AD | 0.168 | 0.21 | 3.96 | 0.020 | 0.0019 | 0.0038 | 0.012 | — | — | — | — | — | | |

| Steel ID | V | Mo | Cu | Sn | Sb | Ta | Ca | Mg | REM | Ac₁ transformation temperature (° C.) | Remarks |
|---|---|---|---|---|---|---|---|---|---|---|---|
| A | — | — | — | — | — | — | — | — | — | 661 | Conforming steel |
| B | — | — | — | — | — | — | — | — | — | 647 | Conforming steel |
| C | — | — | — | — | — | — | — | — | — | 648 | Conforming steel |
| D | — | — | — | — | — | — | — | — | — | 654 | Conforming steel |
| E | — | — | — | — | — | — | — | — | — | 648 | Conforming steel |
| F | — | — | — | — | — | — | — | - | — | 649 | Conforming steel |
| G | — | — | — | — | — | — | — | — | — | 647 | Conforming steel |
| H | — | — | — | — | — | — | — | — | — | 675 | Conforming steel |
| I | — | — | — | — | — | — | — | — | — | 651 | Conforming steel |
| J | — | — | — | — | — | — | — | — | — | 648 | Comparative steel |
| K | — | — | — | — | — | — | — | — | — | 695 | Comparative steel |
| L | — | — | — | — | — | — | — | — | — | 687 | Comparative steel |
| M | — | — | — | — | — | — | — | — | — | 647 | Comparative steel |
| N | — | — | — | — | — | — | — | — | — | 643 | Conforming steel |
| O | — | — | — | — | — | — | — | — | — | 654 | Conforming steel |
| P | — | — | — | — | — | — | — | — | — | 654 | Conforming steel |
| Q | — | — | — | — | — | — | — | — | — | 654 | Conforming steel |
| R | — | — | — | — | — | — | — | — | — | 644 | Conforming steel |
| S | 0.039 | — | — | — | — | — | — | — | — | 650 | Conforming steel |
| T | — | 0.334 | — | — | — | — | — | — | — | 660 | Conforming steel |
| U | — | — | 0.276 | — | — | — | — | — | — | 675 | Conforming steel |
| V | — | — | — | 0.007 | — | — | — | — | — | 652 | Conforming steel |
| W | — | — | — | — | — | 0.007 | — | — | — | 665 | Conforming steel |
| X | — | — | — | — | — | — | — | — | — | 654 | Conforming steel |
| Y | — | — | — | 0.008 | — | — | — | — | — | 661 | Conforming steel |
| Z | — | — | — | — | — | 0.009 | — | — | — | 644 | Conforming steel |
| AA | — | — | — | — | — | — | 0.0022 | — | — | 644 | Conforming steel |
| AB | — | — | — | — | — | — | — | 0.0027 | — | 653 | Conforming steel |
| AC | — | — | — | — | — | — | — | — | 0.0026 | 645 | Conforming steel |
| AD | — | — | — | — | 0.012 | — | — | — | — | 646 | Conforming steel |

Underlined if outside of the appropriate range.

TABLE 2

| | | Hot-rolling conditions | | | Hot band annealing conditions | | Cold rolling conditions | Cold-rolled sheet annealing conditions | | | |
|---|---|---|---|---|---|---|---|---|---|---|---|
| No. | Steel Type | Slab heating temp. (° C.) | Finisher delivery temp. (° C.) | Mean coiling temp. (° C.) | Holding temp. (° C.) | Holding time (s) | Rolling reduction (%) | Holding temp. (° C.) | Holding time (s) | Type* | Remarks |
| 1 | A | 1210 | 890 | 560 | 691 | 21000 | 57.6 | 691 | 10000 | CR | Example |
| 2 | B | 1220 | 880 | 520 | 677 | 19000 | 53.3 | 677 | 12000 | CR | Example |
| 3 | C | 1180 | 880 | 620 | 678 | 14000 | 52.9 | 678 | 15000 | GA | Example |
| 4 | C | 1210 | 690 | 560 | 678 | 20000 | 47.1 | 678 | 10000 | CR | Comparative Example |
| 5 | C | 1220 | 1090 | 510 | 678 | 12000 | 56.3 | 678 | 8000 | CR | Comparative Example |
| 6 | C | 1230 | 850 | 870 | 678 | 9000 | 56.5 | 678 | 6000 | CR | Comparative Example |
| 7 | C | 1250 | 860 | 530 | 500 | 14000 | 61.3 | 678 | 20000 | EG | Comparative Example |
| 8 | C | 1220 | 870 | 510 | 850 | 17000 | 58.8 | 678 | 14000 | CR | Comparative Example |
| 9 | C | 1250 | 880 | 590 | 678 | 200 | 50.0 | 678 | 16000 | CR | Comparative Example |
| 10 | C | 1210 | 850 | 630 | 678 | 19000 | 9.1 | 651 | 12000 | CR | Comparative Example |
| 11 | C | 1220 | 870 | 610 | 678 | 7000 | 57.1 | 500 | 13000 | CR | Comparative Example |
| 12 | C | 1190 | 870 | 580 | 678 | 10000 | 51.7 | 820 | 17000 | Al | Comparative Example |
| 13 | C | 1210 | 850 | 580 | 678 | 13000 | 64.7 | 678 | 250 | CR | Comparative Example |
| 14 | D | 1220 | 850 | 550 | 684 | 18000 | 58.8 | 684 | 10000 | CR | Example |
| 15 | E | 1220 | 880 | 540 | 678 | 7000 | 57.1 | 678 | 12000 | GI | Example |
| 16 | F | 1230 | 890 | 570 | 679 | 17000 | 50.0 | 679 | 14000 | CR | Example |
| 17 | G | 1220 | 880 | 610 | 677 | 7000 | 52.9 | 677 | 16000 | Al | Example |
| 18 | H | 1240 | 850 | 580 | 705 | 10000 | 48.6 | 705 | 8000 | CR | Example |
| 19 | I | 1220 | 910 | 620 | 681 | 14000 | 46.2 | 681 | 5000 | GA | Example |
| 20 | J | 1200 | 850 | 650 | 678 | 15000 | 62.5 | 678 | 9000 | GI | Comparative Example |
| 21 | K | 1190 | 860 | 640 | 725 | 16000 | 61.1 | 725 | 12000 | EG | Comparative Example |
| 22 | L | 1220 | 830 | 590 | 717 | 19000 | 56.3 | 717 | 11000 | CR | Comparative Example |
| 23 | M | 1230 | 820 | 560 | 677 | 8000 | 62.5 | 677 | 16000 | EG | Comparative Example |
| 24 | N | 1240 | 840 | 600 | 673 | 6000 | 61.3 | 673 | 19000 | GI | Example |
| 25 | O | 1250 | 860 | 560 | 684 | 14000 | 50.0 | 684 | 10000 | CR | Example |

TABLE 2-continued

| | | Hot-rolling conditions | | | Hot band annealing conditions | | Cold rolling conditions | Cold-rolled sheet annealing conditions | | | |
|---|---|---|---|---|---|---|---|---|---|---|---|
| No. | Steel Type | Slab heating temp. (°C.) | Finisher delivery temp. (°C.) | Mean coiling temp. (°C.) | Holding temp. (°C.) | Holding time (s) | Rolling reduction (%) | Holding temp. (°C.) | Holding time (s) | Type* | Remarks |
| 26 | P | 1200 | 890 | 540 | 684 | 18000 | 46.2 | 684 | 8000 | GA | Example |
| 27 | Q | 1240 | 830 | 620 | 684 | 19000 | 52.9 | 684 | 14000 | CR | Example |
| 28 | R | 1250 | 820 | 580 | 674 | 14000 | 47.1 | 674 | 13000 | EG | Example |
| 29 | S | 1220 | 870 | 640 | 680 | 9000 | 44.8 | 680 | 10000 | Al | Example |
| 30 | T | 1230 | 810 | 620 | 690 | 12000 | 56.3 | 690 | 8000 | GI | Example |
| 31 | U | 1230 | 840 | 550 | 705 | 15000 | 58.8 | 705 | 6000 | GI | Example |
| 32 | V | 1220 | 910 | 590 | 682 | 14000 | 68.8 | 682 | 8000 | GI | Example |
| 33 | W | 1210 | 900 | 520 | 695 | 12000 | 62.5 | 695 | 12000 | EG | Example |
| 34 | X | 1230 | 880 | 610 | 684 | 16000 | 56.3 | 684 | 14000 | Al | Example |
| 35 | Y | 1240 | 890 | 540 | 691 | 12000 | 53.8 | 691 | 16000 | GA | Example |
| 36 | Z | 1230 | 870 | 560 | 674 | 18000 | 58.8 | 674 | 13000 | GI | Example |
| 37 | AA | 1240 | 890 | 540 | 674 | 9000 | 56.3 | 674 | 12000 | Al | Example |
| 38 | AB | 1230 | 870 | 560 | 683 | 14000 | 56.3 | 683 | 8000 | CR | Example |
| 39 | AC | 1240 | 850 | 550 | 675 | 7000 | 57.1 | 675 | 9000 | CR | Example |
| 40 | AD | 1250 | 870 | 530 | 696 | 12000 | 47.8 | 672 | 9000 | CR | Example |
| 41 | A | 1240 | 880 | 550 | 698 | 20000 | 53.3 | 665 | 10000 | CR | Example |
| 42 | A | 1230 | 890 | 520 | 700 | 18000 | 53.3 | 668 | 8000 | CR | Example |

Underlined if outside of the appropriate range.
*CR: cold-rolled sheet (without coating or plating),
GI: hot-dip galvanized steel sheet (without alloying treatment of galvanized layer),
GA: galvannealed steel sheet,
Al: hot-dip aluminum-coated steel sheet,
EG: electrogalvanized steel sheet.

For each of the steel sheets thus obtained, the cross-sectional microstructure was investigated in accordance with the above procedure. Additionally, each steel sheet was subjected to tensile working with an elongation value of 10% under the conditions as mentioned above, and the volume fraction of retained austenite in the steel sheet after subjection to the tensile working was measured in accordance with the above procedure. The evaluation results are shown in Tables 3-1 and 3-2.

TABLE 3-1

| | | | | | | Steel microstructure | | | | | | | |
|---|---|---|---|---|---|---|---|---|---|---|---|---|---|
| | | Sheet thickness | Area ratio of F | Area ratio of M | Volume fraction of RA | Mean grain size (μm) | | | Grain aspect ratio | | | Residual | |
| No. | Steel Type | (mm) | (%) | (%) | (%) | F | M | RA | F | M | RA | microstructure | Remarks |
| 1 | A | 1.4 | 72.5 | 7.6 | 13.4 | 4.8 | 2.7 | 2.5 | 1.3 | 1.4 | 1.5 | BF, P, θ | Example |
| 2 | B | 1.4 | 59.4 | 11.8 | 19.5 | 4.2 | 1.8 | 1.9 | 1.4 | 1.3 | 1.2 | BF, P, θ | Example |
| 3 | C | 1.6 | 45.5 | 14.7 | 24.9 | 3.1 | 1.1 | 1.2 | 1.5 | 1.4 | 1.2 | BF, P, θ | Example |
| 4 | C | 1.8 | 61.6 | 14.0 | 7.4 | 3.8 | 1.6 | 1.7 | 1.2 | 1.2 | 1.4 | BF, P, θ | Comparative Example |
| 5 | C | 1.4 | 63.8 | 14.6 | 7.7 | 4.0 | 1.9 | 1.5 | 1.2 | 1.2 | 1.6 | BF, P, θ | Comparative Example |
| 6 | C | 1.0 | 59.9 | 13.7 | 18.9 | 7.7 | 4.3 | 4.2 | 1.3 | 1.3 | 1.3 | BF, P, θ | Comparative Example |
| 7 | C | 1.2 | 63.4 | 16.6 | 6.7 | 5.3 | 1.9 | 1.8 | 1.4 | 1.4 | 1.4 | BF, P, θ | Comparative Example |
| 8 | C | 1.4 | 63.9 | 18.0 | 7.2 | 5.1 | 1.6 | 1.5 | 1.6 | 1.5 | 1.5 | BF, P, θ | Comparative Example |
| 9 | C | 1.2 | 61.9 | 16.1 | 6.5 | 5.0 | 1.7 | 1.6 | 1.5 | 1.2 | 1.2 | BF, P, θ | Comparative Example |
| 10 | C | 2.0 | 65.1 | 13.6 | 7.4 | 4.4 | 4.3 | 4.2 | 1.2 | 1.2 | 1.2 | BF, P, θ | Comparative Example |
| 11 | C | 1.2 | 62.4 | 19.3 | 6.5 | 4.4 | 2.4 | 2.2 | 1.3 | 1.3 | 1.4 | BF, P, θ | Comparative Example |
| 12 | C | 1.4 | 61.6 | 18.3 | 6.8 | 4.5 | 2.2 | 2.5 | 1.4 | 1.4 | 1.5 | BF, P, θ | Comparative Example |
| 13 | C | 1.2 | 60.8 | 17.7 | 14.1 | 4.1 | 2.4 | 2.3 | 2.1 | 2.3 | 2.3 | F', BF, P, θ | Comparative Example |
| 14 | D | 1.4 | 57.6 | 11.6 | 18.7 | 4.1 | 1.9 | 1.9 | 1.3 | 1.2 | 1.2 | BF, P, θ | Example |
| 15 | E | 1.2 | 56.8 | 11.8 | 17.1 | 4.0 | 1.6 | 2.0 | 1.4 | 1.1 | 1.3 | BF, P, θ | Example |
| 16 | F | 1.4 | 56.2 | 12.1 | 19.5 | 3.8 | 2.0 | 1.9 | 1.6 | 1.2 | 1.4 | BF, P, θ | Example |
| 17 | G | 1.6 | 74.4 | 8.1 | 13.1 | 5.0 | 2.8 | 2.4 | 1.5 | 1.2 | 1.6 | BF, P, θ | Example |
| 18 | H | 1.8 | 74.5 | 8.4 | 14.1 | 4.7 | 2.6 | 2.3 | 1.2 | 1.2 | 1.5 | BF, P, θ | Example |
| 19 | I | 1.4 | 73.8 | 8.7 | 13.8 | 4.5 | 2.5 | 2.5 | 1.3 | 1.3 | 1.2 | BF, P, θ | Example |
| 20 | J | 1.2 | 88.2 | 5.0 | 3.9 | 7.3 | 0.7 | 0.6 | 1.4 | 1.4 | 1.4 | BF, P, θ | Comparative Example |
| 21 | K | 1.4 | 53.4 | 16.6 | 7.1 | 5.3 | 4.0 | 3.9 | 1.4 | 1.6 | 1.6 | BF, P, θ | Comparative Example |
| 22 | L | 1.4 | 65.4 | 17.1 | 6.5 | 5.7 | 4.6 | 4.0 | 1.3 | 1.5 | 1.2 | BF, P, θ | Comparative Example |
| 23 | M | 1.2 | 56.2 | 12.6 | 13.5 | 7.0 | 4.2 | 4.1 | 1.4 | 1.4 | 1.2 | BF, P, θ | Comparative Example |
| 24 | N | 1.2 | 61.1 | 12.6 | 18.7 | 4.1 | 1.7 | 2.0 | 1.5 | 1.5 | 1.2 | BF, P, θ | Example |

TABLE 3-1-continued

| | | | | Steel microstructure | | | | | | | | | |
|---|---|---|---|---|---|---|---|---|---|---|---|---|---|
| | | Sheet thick- ness | Area ratio of F | Area ratio of M | Volume fraction of RA | Mean grain size (μm) | | | Grain aspect ratio | | | Residual | |
| No. | Steel Type | (mm) | (%) | (%) | (%) | F | M | RA | F | M | RA | microstructure | Remarks |
| 25 | O | 1.4 | 58.4 | 11.0 | 17.7 | 4.2 | 1.8 | 1.5 | 1.2 | 1.2 | 1.3 | BF, P, θ | Example |
| 26 | P | 1.4 | 60.2 | 11.7 | 19.8 | 4.0 | 1.5 | 1.6 | 1.2 | 1.2 | 1.4 | BF, P, θ | Example |
| 27 | Q | 1.6 | 59.2 | 12.0 | 19.9 | 4.2 | 1.8 | 1.7 | 1.2 | 1.2 | 1.6 | BF, P, θ | Example |
| 28 | R | 1.8 | 73.5 | 8.7 | 13.1 | 5.0 | 2.6 | 2.4 | 1.3 | 1.3 | 1.5 | BF, P, θ | Example |
| 29 | S | 1.6 | 74.5 | 9.4 | 12.7 | 4.7 | 2.5 | 2.2 | 1.4 | 1.4 | 1.6 | BF, P, θ | Example |
| 30 | T | 1.4 | 71.9 | 8.4 | 14.5 | 4.5 | 2.4 | 2.2 | 1.6 | 1.6 | 1.5 | BF, P, θ | Example |
| 31 | U | 1.4 | 70.8 | 8.8 | 13.8 | 4.4 | 2.5 | 2.6 | 1.5 | 1.5 | 1.4 | BF, P, θ | Example |
| 32 | V | 1.0 | 74.2 | 8.7 | 13.2 | 4.7 | 2.2 | 2.5 | 1.2 | 1.2 | 1.5 | BF, P, θ | Example |
| 33 | W | 1.2 | 75.4 | 8.0 | 13.5 | 4.6 | 2.4 | 2.2 | 1.6 | 1.6 | 1.6 | BF, P, θ | Example |
| 34 | X | 1.4 | 57.7 | 11.4 | 18.7 | 4.0 | 1.7 | 1.8 | 1.5 | 1.5 | 1.5 | BF, P, θ | Example |
| 35 | Y | 1.2 | 61.2 | 11.8 | 17.2 | 4.4 | 1.8 | 1.9 | 1.4 | 1.4 | 1.4 | BF, P, θ | Example |
| 36 | Z | 1.4 | 60.4 | 11.0 | 20.4 | 4.1 | 1.9 | 1.7 | 1.5 | 1.6 | 1.6 | BF, P, θ | Example |
| 37 | AA | 1.4 | 58.8 | 11.8 | 19.7 | 3.8 | 2.0 | 1.6 | 1.4 | 1.5 | 1.5 | BF, P, θ | Example |
| 38 | AB | 1.4 | 59.2 | 10.8 | 18.7 | 4.0 | 1.8 | 1.6 | 1.5 | 1.4 | 1.4 | BF, P, θ | Example |
| 39 | AC | 1.2 | 59.9 | 11.5 | 18.5 | 4.1 | 1.7 | 1.9 | 1.6 | 1.5 | 1.5 | BF, P, θ | Example |
| 40 | AD | 1.2 | 62.4 | 10.1 | 20.3 | 4.3 | 1.7 | 1.8 | 1.5 | 1.4 | 1.3 | BF, P, θ | Example |
| 41 | A | 1.4 | 64.5 | 10.8 | 19.8 | 4.7 | 2.5 | 2.2 | 1.2 | 1.3 | 1.4 | BF, P, θ | Example |
| 42 | A | 1.4 | 65.1 | 10.2 | 19.4 | 4.5 | 2.3 | 1.9 | 1.3 | 1.2 | 1.5 | BF, P, θ | Example |

Underlined if outside of the appropriate range.
F: polygonal ferrite,
F': non-recrystallized ferrite,
BF: bainitic ferrite,
RA: retained austenite,
M: martensite,
P: pearlite,
θ: carbides (such as cementite)

TABLE 3-2

| | | | | Steel microstructure | | | | |
|---|---|---|---|---|---|---|---|---|
| No. | Mn content in RA (mass %) | Mn content in F (mass %) | Mn content in RA/ Mn content in F | 0.09 × (Mn content in RA) − 0.130 − 0.140 (mass %) | 0.09 × (Mn content in RA) − 0.130 + 0.140 (mass %) | C content in RA (mass %) | Volume fraction of RA after tensile working with elongation value of 10%/ Volume fraction of RA before the tensile working | Remarks |
| 1 | 6.91 | 2.86 | 2.42 | 0.35 | 0.63 | 0.51 | 0.69 | Example |
| 2 | 7.70 | 3.04 | 2.53 | 0.42 | 0.70 | 0.54 | 0.81 | Example |
| 3 | 8.24 | 3.10 | 2.66 | 0.47 | 0.75 | 0.64 | 0.72 | Example |
| 4 | 7.47 | 2.81 | 2.66 | 0.40 | 0.68 | 0.34 | 0.18 | Comparative Example |
| 5 | 7.37 | 2.91 | 2.53 | 0.39 | 0.67 | 0.43 | 0.49 | Comparative Example |
| 6 | 6.91 | 2.99 | 2.31 | 0.35 | 0.63 | 0.27 | 0.10 | Comparative Example |
| 7 | 5.43 | 3.59 | 1.51 | 0.22 | 0.50 | 0.16 | 0.22 | Comparative Example |
| 8 | 5.34 | 3.69 | 1.45 | 0.21 | 0.49 | 0.25 | 0.41 | Comparative Example |
| 9 | 5.28 | 3.70 | 1.43 | 0.21 | 0.49 | 0.25 | 0.38 | Comparative Example |
| 10 | 7.07 | 2.80 | 2.53 | 0.37 | 0.65 | 0.71 | 0.23 | Comparative Example |
| 11 | 5.69 | 3.66 | 1.55 | 0.24 | 0.52 | 0.28 | 0.38 | Comparative Example |
| 12 | 5.56 | 3.77 | 1.47 | 0.23 | 0.51 | 0.17 | 0.24 | Comparative Example |
| 13 | 8.30 | 3.19 | 2.60 | 0.48 | 0.76 | 0.32 | 0.25 | Comparative Example |
| 14 | 7.56 | 2.91 | 2.60 | 0.41 | 0.69 | 0.54 | 0.78 | Example |
| 15 | 7.34 | 2.80 | 2.62 | 0.39 | 0.67 | 0.43 | 0.71 | Example |
| 16 | 7.86 | 2.99 | 2.63 | 0.44 | 0.72 | 0.58 | 0.82 | Example |
| 17 | 6.97 | 2.87 | 2.43 | 0.36 | 0.64 | 0.53 | 0.68 | Example |
| 18 | 7.10 | 2.78 | 2.55 | 0.37 | 0.65 | 0.48 | 0.72 | Example |
| 19 | 6.87 | 2.68 | 2.56 | 0.35 | 0.63 | 0.45 | 0.71 | Example |
| 20 | 6.47 | 2.81 | 2.30 | 0.31 | 0.59 | 0.29 | 0.17 | Comparative Example |
| 21 | 7.31 | 2.89 | 2.53 | 0.39 | 0.67 | 0.23 | 0.18 | Comparative Example |
| 22 | 3.42 | 2.10 | 1.63 | 0.04 | 0.32 | 0.03 | 0.25 | Comparative Example |
| 23 | 7.30 | 2.91 | 2.51 | 0.39 | 0.67 | 0.43 | 0.51 | Comparative Example |
| 24 | 7.61 | 3.00 | 2.54 | 0.41 | 0.69 | 0.50 | 0.82 | Example |
| 25 | 7.66 | 2.87 | 2.67 | 0.42 | 0.70 | 0.50 | 0.75 | Example |
| 26 | 7.51 | 2.91 | 2.58 | 0.41 | 0.69 | 0.58 | 0.74 | Example |
| 27 | 7.41 | 3.00 | 2.47 | 0.40 | 0.68 | 0.51 | 0.69 | Example |
| 28 | 6.60 | 2.77 | 2.38 | 0.32 | 0.60 | 0.48 | 0.74 | Example |
| 29 | 6.89 | 2.83 | 2.43 | 0.35 | 0.63 | 0.47 | 0.78 | Example |
| 30 | 6.91 | 2.76 | 2.50 | 0.35 | 0.63 | 0.49 | 0.81 | Example |
| 31 | 7.01 | 2.67 | 2.63 | 0.36 | 0.64 | 0.50 | 0.72 | Example |

TABLE 3-2-continued

| | | | | Steel microstructure | | | | |
|---|---|---|---|---|---|---|---|---|
| No. | Mn content in RA (mass %) | Mn content in F (mass %) | Mn content in RA/ Mn content in F | 0.09 × (Mn content in RA) − 0.130 − 0.140 (mass %) | 0.09 × (Mn content in RA) − 0.130 + 0.140 (mass %) | C content in RA (mass %) | Volume fraction of RA after tensile working with elongation value of 10%/ Volume fraction of RA before the tensile working | Remarks |
| 32 | 6.50 | 2.73 | 2.38 | 0.32 | 0.60 | 0.46 | 0.69 | Example |
| 33 | 6.80 | 2.70 | 2.52 | 0.34 | 0.62 | 0.51 | 0.84 | Example |
| 34 | 7.87 | 2.91 | 2.70 | 0.44 | 0.72 | 0.55 | 0.69 | Example |
| 35 | 7.48 | 2.81 | 2.66 | 0.40 | 0.68 | 0.50 | 0.72 | Example |
| 36 | 7.61 | 2.70 | 2.82 | 0.41 | 0.69 | 0.57 | 0.64 | Example |
| 37 | 7.38 | 2.91 | 2.54 | 0.39 | 0.67 | 0.51 | 0.68 | Example |
| 38 | 7.58 | 2.80 | 2.71 | 0.41 | 0.69 | 0.58 | 0.74 | Example |
| 39 | 7.56 | 2.81 | 2.69 | 0.41 | 0.69 | 0.52 | 0.76 | Example |
| 40 | 7.28 | 2.86 | 2.55 | 0.39 | 0.67 | 0.57 | 0.69 | Example |
| 41 | 6.61 | 2.73 | 2.42 | 0.32 | 0.60 | 0.30 | 0.29 | Example |
| 42 | 6.72 | 2.77 | 2.43 | 0.33 | 0.61 | 0.32 | 0.28 | Example |

Underlined if outside of the appropriate range.
F: polygonal ferrite,
F': non-recrystallized ferrite,
BF: bainitic ferrite,
RA: retained austenite,
M: martensite,
P: pearlite,
θ: carbides (such as cementite)

Further, each of the steel sheets thus obtained was subjected to tensile test, bend test, and hole expansion test to evaluate tensile property, bendability, and hole expansion formability respectively in the following way.

Tensile test was performed in accordance with JIS Z 2241 (2011) to measure YP (yield stress), YR (yield ratio), TS (tensile strength), and EL (total elongation) using JIS No. 5 test pieces, each of which was sampled in a manner that the tensile direction was perpendicular to the rolling direction of the steel sheet. Note that YR is YP divided by TS, expressed as a percentage.

In this case, the results were determined to be good if YR<68%, TS≥590 MPa, and TS*EL≥24,000 MPa·%, and if EL≥34% for TS 590 MPa grade, EL≥30% for TS 780 MPa grade, and EL≥24% for TS 980 MPa grade or higher.

In this case, a steel sheet of TS 590 MPa grade refers to a steel sheet with TS of 590 MPa or more and less than 780 MPa, a steel sheet of TS 780 MPa grade refers to a steel sheet with TS of 780 MPa or more and less than 980 MPa, and a steel sheet of TS 980 MPa grade refers to a steel sheet with TS of 980 MPa or more and less than 1180 MPa.

Bend test was performed according to the V-block method specified in JIS Z 2248 (1996). Each steel sheet was visually observed under a stereoscopic microscope for cracks on the outside of the bent portion, and the minimum bending radius without cracks was used as the limit bending radius R.

In this case, the bendability of the steel sheet was determined to be good if the following condition was satisfied: at 90° V-bending, R/t≤1.5 (where t is the thickness of the steel sheet).

Further, hole expansion test was performed in accordance with JIS Z 2256 (2010). Each of the steel sheets obtained was cut to a size of 100 mm*100 mm, and a hole of 10 mm in diameter was drilled through each sample with clearance 12%±1%. Then, each steel sheet was clamped into a die having an inner diameter of 75 mm with a blank holding force of 9 tons (88.26 kN). In this state, a conical punch of 60° was pushed into the hole, and the hole diameter at the crack initiation limit was measured. Then, to evaluate hole expansion formability, the maximum hole expansion ratio λ (%) was calculated by:

Maximum hole expansion ratio $\lambda$ (%)=$\{(D_f-D_0)/D_0\}*100$ where $D_f$ is a hole diameter at the time of occurrence of cracking (mm) and $D_0$ is an initial hole diameter (mm).

In this case, the hole expansion formability was determined to be good when λ≥30% for TS 590 MPa grade, λ≥25% for TS 780 MPa grade, and λ≥20% for TS 980 MPa grade.

Additionally, during the manufacture of steel sheets, measurements were made of productivity, sheet passage ability during hot rolling and cold rolling, and surface characteristics of final-annealed sheets (steel sheets obtained after cold-rolled sheet annealing).

In this case, productivity was evaluated according to the lead time costs, including:

(1) malformation of a hot-rolled sheet occurred;
(2) a hot-rolled sheet requires straightening before proceeding to the subsequent steps; and
(3) a prolonged annealing treatment holding time.

The productivity was determined to be "high" when none of (1) to (3) applied and "low" when any of (1) to (3) applied.

The sheet passage ability during hot rolling was determined to be low if the risk of trouble during rolling increased with increasing rolling load. Similarly, the sheet passage ability during cold rolling was determined to be low when the risk of trouble during rolling increased with increasing rolling load.

Furthermore, the surface characteristics of each final-annealed sheet were determined to be poor when defects such as blow hole generation and segregation on the surface layer of the slab could not be scaled-off, cracks and irregularities on the steel sheet surface increased, and a smooth steel sheet surface could not be obtained. The surface characteristics were also determined to be poor when the amount of oxides (scales) generated suddenly increased, the interface between the steel substrate and oxides was roughened, and the surface quality after pickling and cold rolling degraded, or when some hot-rolling scales remained after pickling. The evaluation results are shown in Table 4.

TABLE 4

| No. | YP (MPa) | YR (%) | TS (MPa) | EL (%) | TS × EL (MPa · %) | Bend test results R/t | Hole expansion test results λ (%) | Productivity | Sheet passage ability in hot rolling | Sheet passage ability in cold rolling | Surface characteristics of final-annealed sheet | Remarks |
|---|---|---|---|---|---|---|---|---|---|---|---|---|
| 1 | 312 | 49.8 | 627 | 38.3 | 24014 | 0.2 | 58 | High | High | High | Good | Example |
| 2 | 489 | 60.7 | 806 | 35.2 | 28371 | 0.4 | 40 | High | High | High | Good | Example |
| 3 | 595 | 58.7 | 1014 | 31.5 | 31941 | 0.5 | 31 | High | High | High | Good | Example |
| 4 | 494 | 59.5 | 830 | 22.0 | 18260 | 1.7 | 16 | Low | Low | Low | Poor | Comparative Example |
| 5 | 489 | 59.9 | 817 | 22.5 | 18383 | 1.8 | 17 | Low | High | Low | Poor | Comparative Example |
| 6 | 298 | 54.7 | 545 | 28.5 | 15533 | 1.5 | 15 | High | High | High | Good | Comparative Example |
| 7 | 497 | 59.2 | 839 | 22.6 | 18961 | 0.8 | 31 | High | High | Low | Good | Comparative Example |
| 8 | 485 | 56.6 | 857 | 23.6 | 20225 | 0.7 | 32 | High | High | High | Good | Comparative Example |
| 9 | 457 | 56.6 | 808 | 23.8 | 19230 | 0.8 | 29 | High | High | Low | Good | Comparative Example |
| 10 | 454 | 55.6 | 817 | 21.7 | 17729 | 1.4 | 19 | High | High | High | Good | Comparative Example |
| 11 | 497 | 57.8 | 860 | 21.6 | 18576 | 0.8 | 28 | High | High | High | Good | Comparative Example |
| 12 | 504 | 59.3 | 850 | 20.7 | 17595 | 0.7 | 31 | Low | High | High | Good | Comparative Example |
| 13 | 689 | 78.8 | 874 | 33.0 | 28842 | 0.8 | 32 | High | High | High | Good | Comparative Example |
| 14 | 490 | 59.8 | 820 | 35.0 | 28700 | 0.4 | 37 | High | High | High | Good | Example |
| 15 | 457 | 54.0 | 846 | 32.9 | 27833 | 0.6 | 35 | High | High | High | Good | Example |
| 16 | 498 | 59.4 | 838 | 35.2 | 29498 | 0.4 | 38 | High | High | High | Good | Example |
| 17 | 312 | 48.9 | 638 | 37.9 | 24180 | 0.2 | 51 | High | High | High | Good | Example |
| 18 | 312 | 50.2 | 621 | 38.7 | 24033 | 0.1 | 59 | High | High | High | Good | Example |
| 19 | 312 | 50.6 | 617 | 39.0 | 24063 | 0.2 | 56 | High | High | High | Good | Example |
| 20 | 120 | 22.0 | 545 | 32.0 | 17440 | 0.2 | 58 | High | High | High | Good | Comparative Example |
| 21 | 702 | 59.0 | 1190 | 15.9 | 18921 | 1.8 | 9 | High | High | High | Poor | Comparative Example |
| 22 | 425 | 51.5 | 825 | 20.9 | 17243 | 1.1 | 34 | High | High | High | Good | Comparative Example |
| 23 | 298 | 35.6 | 838 | 29.0 | 24302 | 1.7 | 9 | High | High | High | Good | Comparative Example |
| 24 | 474 | 58.0 | 817 | 36.5 | 29821 | 0.4 | 35 | High | High | High | Good | Example |
| 25 | 459 | 54.2 | 847 | 35.9 | 30407 | 0.4 | 32 | High | High | High | Good | Example |
| 26 | 505 | 62.7 | 805 | 36.0 | 28980 | 0.5 | 38 | High | High | High | Good | Example |
| 27 | 504 | 63.8 | 790 | 36.5 | 28835 | 0.3 | 37 | High | High | High | Good | Example |
| 28 | 302 | 48.9 | 617 | 39.5 | 24372 | 0.1 | 46 | High | High | High | Good | Example |
| 29 | 323 | 51.2 | 631 | 39.6 | 24988 | 0.3 | 55 | High | High | High | Good | Example |
| 30 | 300 | 50.5 | 594 | 41.3 | 24532 | 0.2 | 49 | High | High | High | Good | Example |
| 31 | 334 | 49.3 | 678 | 37.6 | 25493 | 0.4 | 57 | High | High | High | Good | Example |
| 32 | 348 | 53.5 | 650 | 37.0 | 24050 | 0.3 | 45 | High | High | High | Good | Example |
| 33 | 340 | 51.8 | 657 | 36.8 | 24178 | 0.2 | 47 | High | High | High | Good | Example |
| 34 | 521 | 60.6 | 860 | 34.9 | 30014 | 0.4 | 35 | High | High | High | Good | Example |
| 35 | 505 | 59.4 | 850 | 35.2 | 29920 | 0.6 | 32 | High | High | High | Good | Example |
| 36 | 508 | 62.0 | 820 | 36.5 | 29930 | 0.4 | 33 | High | High | High | Good | Example |
| 37 | 478 | 58.9 | 811 | 37.0 | 30007 | 0.4 | 37 | High | High | High | Good | Example |
| 38 | 459 | 57.0 | 805 | 34.9 | 28095 | 0.2 | 38 | High | High | High | Good | Example |
| 39 | 500 | 61.0 | 820 | 35.3 | 28946 | 0.4 | 33 | High | High | High | Good | Example |
| 40 | 586 | 59.7 | 982 | 30.2 | 29656 | 1.0 | 41 | High | High | High | Good | Example |
| 41 | 447 | 56.4 | 792 | 31.2 | 24710 | 0.8 | 35 | High | High | High | Good | Example |
| 42 | 452 | 57.4 | 787 | 31.5 | 24791 | 1.0 | 32 | High | High | High | Good | Example |

It can be seen that the steel sheets in our examples all have a tensile strength (TS) of 590 MPa or more and a yield ratio (YR) of less than 68%, and that our examples may thus provide high-strength steel sheets having good ductility and a good balance between strength and ductility, as well as excellent bendability and hole expansion formability. It can also be appreciated that our examples all exhibited excellent productivity and sheet passage ability during hot rolling and cold rolling, as well as excellent surface characteristics of the final-annealed sheet.

In contrast, the comparative examples all failed to provide desired properties in terms of at least one of tensile strength, yield ratio, ductility, balance between strength and ductility, bendability, and hole expansion formability.

INDUSTRIAL APPLICABILITY

According to the disclosure, it becomes possible to manufacture high-strength steel sheets with excellent formability and low yield ratio that exhibit YR (yield ratio) of less than 68% and TS (tensile strength) of 590 MPa or more. High-strength steel sheets according to the disclosure are highly beneficial in industrial terms, because they can improve fuel efficiency when applied to, for example, automobile structural parts, by a reduction in the weight of automotive bodies.

The invention claimed is:

1. A high-strength steel sheet comprising:
a chemical composition consisting of, in mass %, C: 0.030% or more and 0.250% or less, Si: 0.01% or more and 3.00% or less, Mn: 3.15% or more and 4.20% or less, P: 0.001% or more and 0.100% or less, S: 0.0001% or more and 0.0200% or less, N: 0.0005% or more and 0.0100% or less, Ti: 0.003% or more and 0.200% or less,
optionally at least one selected from the group consisting of Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.000% or less, V: 0.005% or more and 0.500% or less, Mo: 0.005% or more and 1.000% or less, Cu: 0.005% or more and 1.000% or less, Sn: 0.002% or more and 0.200% or less, Sb: 0.002% or more and 0.200% or less, Ta: 0.001 or more and 0.010% or less, Ca: 0.0005% or more and 0.0050% or less, Mg: 0.0005% or more and 0.0050% or less, and REM: 0.0005% or more and 0.0050% or less, and the balance consisting of Fe and incidental impurities; and a steel microstructure that contains, in area ratio, 35% or more and 80% or less of polygonal ferrite and 5% or more and 25% or less of martensite, and that contains, in volume fraction, 12.7% or more of retained austenite, wherein the polygonal ferrite has a mean grain size of 6 μm or less, the martensite has a mean grain size of 3 μm or less, the retained austenite has a mean grain size of 3 μm or less, and the polygonal ferrite, the martensite, and the retained austenite each have a mean grain aspect ratio of 2.0 or less, and wherein a value obtained by dividing an Mn content in the retained austenite in mass % by an Mn content in the polygonal ferrite in mass % equals 2.0 or more; and a tensile strength TS of 590 MPa to 860 MPa.

2. The high-strength steel sheet according to claim 1, wherein the retained austenite has a C content that satisfies the following formula in relation to the Mn content in the retained austenite:

$$0.09*[\text{Mn content}]-0.130-0.140 \leq [\text{C content}] \leq 0.09*[\text{Mn content}]-0.130+0.140$$

where

[C content] is the C content in the retained austenite in mass %, and

[Mn content] is the Mn content in the retained austenite in mass %.

3. The high-strength steel sheet according to claim 1, wherein when the steel sheet is subjected to tensile working with an elongation value of 10%, a value obtained by dividing a volume fraction of the retained austenite after the tensile working by a volume fraction of the retained austenite before the tensile working equals 0.3 or more.

4. The high-strength steel sheet according to claim 1, wherein the steel sheet further comprises a hot-dip galvanized layer, a hot-dip aluminum-coated layer or an electrogalvanized layer.

5. The high-strength steel sheet according to claim 1, wherein N content of the chemical composition is 0.0010% or more and 0.0070% or less.

6. The high-strength steel sheet according to claim 1, wherein C content of the chemical composition is 0.080% or more and 0.200% or less.

7. The high-strength steel sheet according to claim 6, wherein N content of the chemical composition is 0.0010% or more and 0.0070% or less.

8. The high-strength steel sheet according to claim 1, wherein Mn content of the chemical composition is 3.62% or more and 4.20% or less.

9. The high-strength steel sheet according to claim 8, wherein N content of the chemical composition is 0.0010% or more and 0.0070% or less.

10. The high-strength steel sheet according to claim 8, wherein C content of the chemical composition is 0.080% or more and 0.200% or less.

11. The high-strength steel sheet according to claim 10, wherein N content of the chemical composition is 0.0010% or more and 0.0070% or less.

12. A method for manufacturing the high-strength steel sheet according to claim 1, the method comprising:

subjecting a steel slab having the chemical composition according to claim 1 to hot rolling whereby the steel slab is heated to 1100° C. or higher and 1300° C. or lower, hot rolled with a finisher delivery temperature of 750° C. or higher and 1000° C. or lower, and coiled at a mean coiling temperature of 300° C. or higher and 750° C. or lower to obtain a hot-rolled sheet;

subjecting the hot-rolled sheet to pickling to remove scales;

subjecting the hot-rolled sheet to hot band annealing whereby the hot-rolled sheet is retained in a temperature range of $Ac_1$ transformation temperature+20° C. to $Ac_1$ transformation temperature+120° C. for 600 s to 21,600 s;

subjecting the hot-rolled sheet to cold rolling whereby the hot-rolled sheet is cold rolled at a rolling reduction of 30% or more to obtain a cold-rolled sheet; and subjecting the cold-rolled sheet to cold-rolled sheet annealing whereby the cold-rolled sheet is retained in a temperature range of $Ac_1$ transformation temperature to $Ac_1$ transformation temperature+100° C. for more than 900 s to 21,600 s or less, and subsequently cooled.

13. The method according to claim 12, further comprising: after the cold-rolled sheet annealing, subjecting the cold-rolled sheet to any one of the following:

galvanizing treatment, or to hot-dip galvanizing treatment followed by alloying treatment in a temperature range of 450° C. or higher and 600° C. or lower, hot-dip aluminum-coating treatment, or electrogalvanizing treatment.

* * * * *

UNITED STATES PATENT AND TRADEMARK OFFICE
CERTIFICATE OF CORRECTION

PATENT NO. : 10,954,578 B2
APPLICATION NO. : 15/520236
DATED : March 23, 2021
INVENTOR(S) : Yoshiyasu Kawasaki et al.

Page 1 of 1

It is certified that error appears in the above-identified patent and that said Letters Patent is hereby corrected as shown below:

On the Title Page

Under OTHER PUBLICATIONS on page 2:
Lines 4-6, please delete "Jul. 17, 2018, Office Action issued by the Korean Intellectual Property Office in the corresponding Korean Patent Application No. 10-2017-7014210 with English language." and insert --Jul. 17, 2018, Office Action issued by the Korean Intellectual Property Office in the corresponding Korean Patent Application No. 10-2017-7014210 with English language concise statement of relevance.--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*